(12) United States Patent  
Abe

(10) Patent No.: US 6,222,946 B1
(45) Date of Patent: Apr. 24, 2001

(54) IMAGE COMPRESSION AND EXPANSION DEVICE

(75) Inventor: Nobuaki Abe, Hokkaido (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/114,073

(22) Filed: Jul. 13, 1998

(30) Foreign Application Priority Data

Jul. 14, 1997 (JP) .................................... 9-203879
Mar. 31, 1998 (JP) .................................. 10-103438

(51) Int. Cl.$^7$ .......................... G06K 9/36; G06K 9/46; G06K 9/38; G06F 15/332
(52) U.S. Cl. ......................... 382/281; 382/248; 382/251
(58) Field of Search .................................. 382/106, 232, 382/240, 248, 251, 276, 281; 358/432, 261.3; 348/27, 403, 405; 364/724.16

(56) References Cited

U.S. PATENT DOCUMENTS 5,374,958 * 12/1994 Yanagihara ........................... 348/405
5,854,756 * 12/1998 Willink ............................ 364/724.16

OTHER PUBLICATIONS

R.C.Gonzalez, R.E.Woods, "Digital immage processing", Addison–Wesley Publication Company, pp. 374–376,384–387, 1992.*

An article by Ryozo Nishina et al., entitled "Two Types of Distortionless Image Compression Coding Systems Developed".

The Journal of TIEICE, vol. 79, No. 11, p. 1185, Nov. 1996, along with an English Language Translation.

* cited by examiner

*Primary Examiner*—Leo Boudreau
*Assistant Examiner*—Dmitry A. Novik
(74) *Attorney, Agent, or Firm*—Greenblum & Bernstein, P.L.C.

(57) ABSTRACT

The image compression and expansion device comprises a recording medium, in which compressed image data, which are obtained by applying an Hadamard's transformation, a quantization and an encoding to original image data, and a quantization table are recorded. The compressed image data are decoded by a decoding unit. The decoded image data are dequantized by the quantization table. The dequantized image data are converted to corrected dequantized image data, which are then subjected to an inverse Hadamard's transformation, so that reproduced image data are generated. The quantization table is composed of quantization coefficients, each of which is to the power of 2.

10 Claims, 19 Drawing Sheets

Fig. 6A

QUANTIZED HADAMARD'S TRANS. COEF.

$$B_{vu} = \begin{pmatrix} 10280 & 175 & -59 & 40 & 10 & 5 & -11 & 13 \\ -277 & 63 & -4 & 11 & 3 & -8 & -5 & 1 \\ 9 & -10 & 1 & -5 & -4 & 0 & 5 & 0 \\ -68 & 13 & 0 & -1 & 1 & 0 & 4 & 0 \\ -5 & -9 & -1 & -2 & -7 & 1 & 1 & -1 \\ -2 & -3 & 2 & -3 & 2 & 2 & 0 & 0 \\ -5 & -3 & 1 & -1 & 0 & -1 & 2 & 0 \\ -15 & 3 & 1 & 0 & 0 & 0 & 0 & 0 \end{pmatrix}$$

QUANTIZATION TABLE $$Q_{vu} = \begin{pmatrix} 1 & 2 & 2 & 4 & 2 & 4 & 4 & 8 \\ 2 & 4 & 4 & 8 & 4 & 8 & 8 & 16 \\ 2 & 4 & 4 & 8 & 4 & 8 & 8 & 16 \\ 4 & 8 & 8 & 16 & 8 & 16 & 16 & 32 \\ 2 & 4 & 4 & 8 & 4 & 8 & 8 & 16 \\ 4 & 8 & 8 & 16 & 8 & 16 & 16 & 32 \\ 4 & 8 & 8 & 16 & 8 & 16 & 16 & 32 \\ 8 & 16 & 16 & 32 & 16 & 32 & 32 & 64 \end{pmatrix}$$

↓ DEQUANT.

DEQUANTIZED HADAMARD'S TRANS. COEF.

$$A'_{vu} = \begin{pmatrix} 10280 & 350 & -118 & 160 & 20 & 20 & -44 & 104 \\ -554 & 252 & -16 & 88 & 12 & -61 & -40 & 16 \\ 18 & -40 & 4 & -40 & -16 & 0 & 40 & 0 \\ -272 & 104 & 0 & -16 & 8 & 0 & 64 & 0 \\ -10 & -36 & -4 & -16 & -28 & 8 & 8 & -16 \\ -8 & -24 & 16 & -48 & 16 & 32 & 0 & 0 \\ -20 & -24 & 8 & -16 & 0 & -16 & 32 & 0 \\ -120 & 48 & 16 & 0 & 0 & 0 & 0 & 0 \end{pmatrix}$$

CORRECTED DEQUANT. HADAMARD'S TRANS. COEF.

$$A''_{vu} = \begin{pmatrix} 10280 & 350 & -118 & 160 & 20 & 18 & -42 & 100 \\ -554 & 252 & -16 & 86 & 10 & -64 & -36 & 18 \\ 18 & -40 & 4 & -38 & -14 & 0 & 36 & 2 \\ -272 & 102 & 2 & -8 & 8 & -2 & 66 & 8 \\ -10 & -36 & -4 & -14 & -26 & 4 & 4 & -14 \\ -8 & -26 & 14 & -52 & 16 & 30 & 6 & -12 \\ -20 & -22 & 10 & -8 & 0 & -10 & 38 & -4 \\ -122 & 60 & 12 & 2 & 2 & 8 & 8 & 14 \end{pmatrix}$$

↓ INVERSE HADAMARD'S TRANS.

INVERSE HADAMARD'S TRANS. COEF. (REPRODUCED IMAGE DATA)

$$P'_{yx} = \begin{pmatrix} 159 & 153 & 158 & 152 & 140 & 138 & 132 & 132 \\ 164 & 162 & 162 & 157 & 151 & 142 & 134 & 132 \\ 167 & 168 & 161 & 160 & 158 & 145 & 139 & 134 \\ 164 & 168 & 161 & 166 & 162 & 152 & 149 & 141 \\ 171 & 166 & 168 & 167 & 163 & 162 & 157 & 151 \\ 173 & 164 & 169 & 170 & 166 & 166 & 162 & 161 \\ 175 & 169 & 172 & 176 & 174 & 172 & 174 & 166 \\ 173 & 172 & 175 & 173 & 180 & 181 & 177 & 172 \end{pmatrix}$$

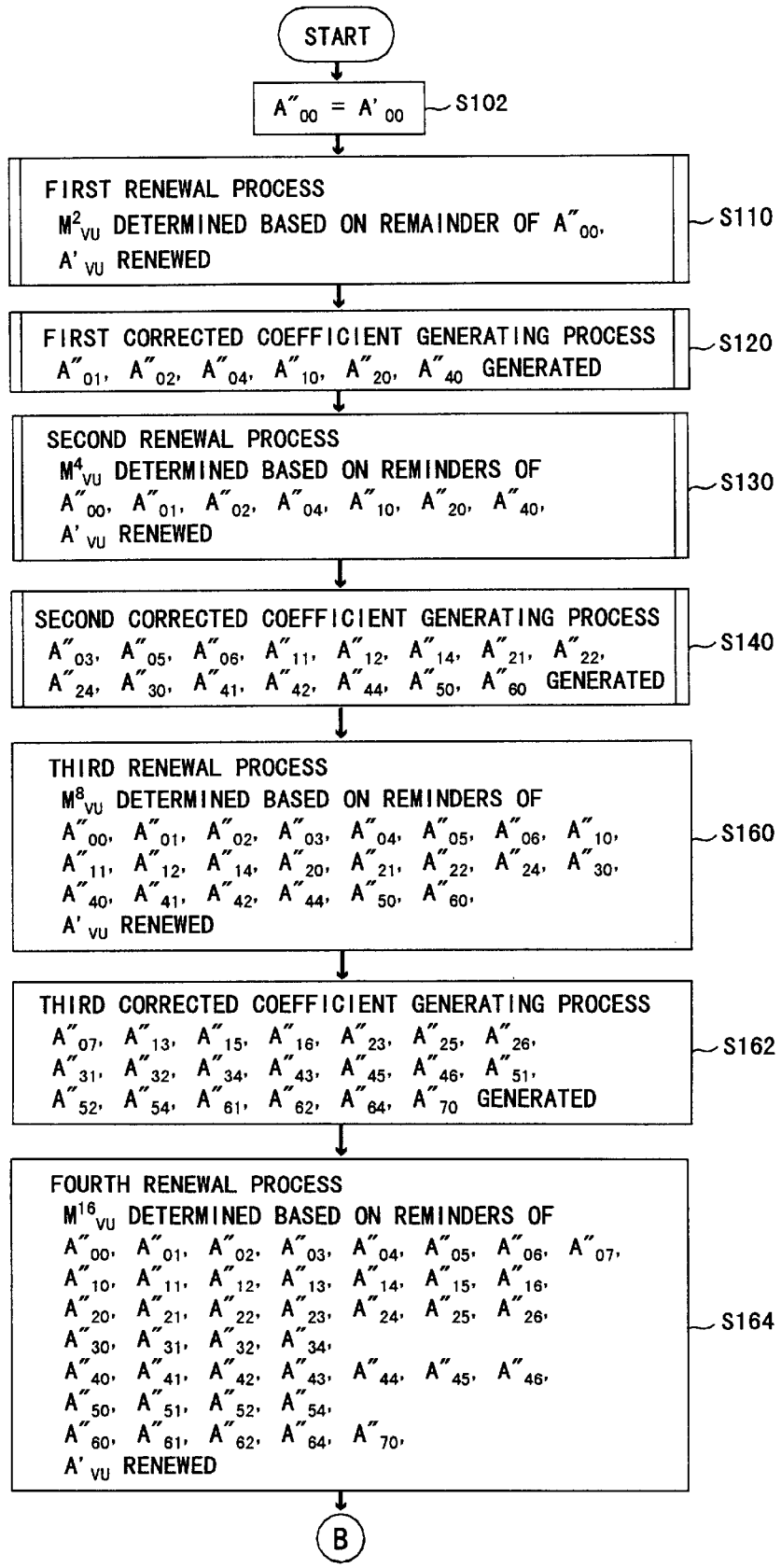

Fig. 12

REMAINDERS $M^2_{VU}$

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Fig. 13

CORRECTED DEQUANT. HADAMARD'S TRANS. COEF.

| 10280 | 350 | -118 |  | 20 |  |  |  |
|---|---|---|---|---|---|---|---|
| -554 |  |  |  |  |  |  |  |
| 18 |  |  |  |  |  |  |  |
|  |  |  |  |  |  |  |  |
| -10 |  |  |  |  |  |  |  |
|  |  |  |  |  |  |  |  |
|  |  |  |  |  |  |  |  |
|  |  |  |  |  |  |  |  |

Fig. 14

| KNOWN $M^4_{VU}$ | OBTAINED $M^4_{VU}$ |
|---|---|
| $M^4_{00}$, $M^4_{20}$, $M^4_{02}$ | $M^4_{22}$ |
| $M^4_{40}$ | $M^4_{42}$, $M^4_{60}$, $M^4_{62}$ |
| $M^4_{04}$ | $M^4_{24}$, $M^4_{44}$, $M^4_{64}$, $M^4_{06}$ $M^4_{26}$, $M^4_{46}$, $M^4_{66}$ |
| $M^4_{10}$ | $M^4_{30}$, $M^4_{50}$, $M^4_{70}$, $M^4_{12}$ $M^4_{32}$, $M^4_{52}$, $M^4_{72}$, $M^4_{14}$ $M^4_{34}$, $M^4_{54}$, $M^4_{74}$, $M^4_{16}$ $M^4_{36}$, $M^4_{56}$, $M^4_{76}$ |
| $M^4_{01}$ | $M^4_{11}$ AND OTHERS |

Fig. 15

REMAINDERS $M^4_{VU}$

| 0 | 2 | -2 | 0 | 0 | 2 | -2 | 0 |
|---|---|---|---|---|---|---|---|
| -2 | 0 | 0 | 2 | 2 | 0 | 0 | 2 |
| 2 | 0 | 0 | -2 | -2 | 0 | 0 | 2 |
| 0 | 2 | 2 | 0 | 0 | 2 | 2 | 0 |
| -2 | 0 | 0 | -2 | -2 | 0 | 0 | -2 |
| 0 | -2 | 2 | 0 | 0 | 2 | 2 | 0 |
| 0 | -2 | 2 | 0 | 0 | -2 | 2 | 0 |
| -2 | 0 | 0 | 2 | 2 | 0 | 0 | 2 |

Fig. 16

CORRECTED DEQUANT.
HADAMARD'S TRANS. COEF. $A''_{VU}$

| 10280 | 350 | -118 | 160 | 20 | 18 | -42 | |
|---|---|---|---|---|---|---|---|
| -554 | 252 | -16 | | 10 | | | |
| 18 | -40 | 4 | | -14 | | | |
| -272 | | | | | | | |
| -10 | -36 | -4 | | -26 | | | |
| -8 | | | | | | | |
| -20 | | | | | | | |
| | | | | | | | |

Fig. 17

| KNOWN $M^8_{VU}$ | OBTAINED $M^8_{VU}$ |
|---|---|
| $M^8_{00}$, $M^8_{20}$, $M^8_{40}$, $M^8_{60}$, $M^8_{02}$, $M^8_{22}$, $M^8_{42}$ | $M^8_{62}$ |
| $M^8_{04}$, $M^8_{24}$, $M^8_{44}$ | $M^8_{64}$ |
| $M^8_{06}$ | $M^8_{26}$, $M^8_{46}$, $M^8_{66}$ |
| $M^8_{10}$, $M^8_{30}$, $M^8_{50}$ | $M^8_{70}$ |
| $M^8_{12}$ | $M^8_{32}$, $M^8_{52}$, $M^8_{72}$ |
| $M^8_{14}$ | $M^8_{34}$, $M^8_{54}$, $M^8_{74}$, $M^8_{16}$, $M^8_{36}$, $M^4_{56}$, $M^4_{76}$ |
| $M^8_{01}$, $M^8_{21}$, $M^8_{41}$ | $M^8_{61}$ |
| $M^8_{03}$ | $M^8_{23}$, $M^8_{43}$, $M^8_{63}$ |
| $M^8_{05}$ | $M^8_{25}$, $M^8_{45}$, $M^8_{65}$, $M^8_{07}$, $M^8_{27}$, $M^4_{47}$, $M^4_{67}$ |
| $M^8_{11}$ | $M^8_{31}$ |

Fig. 18

REMAINDERS $M^8_{VU}$

| 0 | 6 | -6 | 0 | 4 | 2 | -2 | (4) |
|---|---|---|---|---|---|---|---|
| -2 | 4 | 0 | (6) | 2 | 0 | (-4) | 2 |
| 2 | 0 | 4 | (-6) | -6 | (0) | (4) | 2 |
| 0 | (6) | (2) | 0 | (0) | 6 | 2 | 0 |
| -2 | -4 | -4 | (-6) | -2 | (4) | (4) | -6 |
| 0 | (-2) | (6) | -4 | (0) | 6 | 6 | 4 |
| -4 | (-6) | (2) | 0 | (0) | -2 | 6 | 4 |
| (-2) | 4 | 4 | 2 | 2 | 0 | 0 | 6 |

Fig. 19

CORRECTED DEQUANT. HADAMARD'S TRANS. COEF. $A''_{VU}$

| 10280 | 350 | -118 | 160 | 20 | 18 | -42 | 100 |
|---|---|---|---|---|---|---|---|
| -554 | 252 | -16 | 86 | 10 | -64 | -36 | |
| 18 | -40 | 4 | -38 | -14 | 0 | 36 | |
| -272 | 102 | 2 | | 8 | | | |
| -10 | -36 | -4 | -14 | -26 | 4 | 4 | |
| -8 | -26 | 14 | | 16 | | | |
| -20 | -22 | 10 | | 0 | | | |
| -122 | | | | | | | |

Fig. 20

| KNOWN $M^{16}_{vu}$ | OBTAINED $M^{16}_{vu}$ |
|---|---|
| $M^{16}_{00}$, $M^{16}_{20}$, $M^{16}_{40}$, $M^{16}_{60}$, $M^{16}_{02}$, $M^{16}_{22}$, $M^{16}_{42}$, $M^{16}_{62}$, $M^{16}_{04}$, $M^{16}_{24}$, $M^{16}_{44}$, $M^{16}_{64}$, $M^{16}_{06}$, $M^{16}_{26}$, $M^{16}_{46}$ | $M^{16}_{66}$ |
| $M^{16}_{10}$, $M^{16}_{30}$, $M^{16}_{50}$, $M^{16}_{70}$, $M^{16}_{12}$, $M^{16}_{32}$, $M^{16}_{52}$ | $M^{16}_{72}$ |
| $M^{16}_{14}$, $M^{16}_{34}$, $M^{16}_{54}$ | $M^{16}_{74}$ |
| $M^{16}_{16}$ | $M^{16}_{36}$, $M^{16}_{56}$, $M^{16}_{76}$ |
| $M^{16}_{01}$, $M^{16}_{21}$, $M^{16}_{41}$, $M^{16}_{61}$, $M^{16}_{03}$, $M^{16}_{23}$, $M^{16}_{43}$ | $M^{16}_{63}$ |
| $M^{16}_{05}$, $M^{16}_{25}$, $M^{16}_{45}$ | $M^{16}_{65}$ |
| $M^{16}_{07}$ | $M^{16}_{27}$, $M^{16}_{47}$, $M^{16}_{67}$ |
| $M^{16}_{11}$, $M^{16}_{31}$, $M^{16}_{51}$ | $M^{16}_{71}$ |
| $M^{16}_{13}$ | $M^{16}_{33}$, $M^{16}_{53}$, $M^{16}_{73}$ |
| $M^{16}_{15}$ | $M^{16}_{35}$ |

Fig. 21

REMAINDERS $M^{16}_{vu}$

| 8 | 14 | -6 | 0 | 4 | 2 | -10 | 4 |
|---|---|---|---|---|---|---|---|
| -10 | 12 | 0 | 6 | 10 | 0 | -4 | ②|
| 2 | -8 | 4 | -6 | -14 | 0 | 4 | ② |
| 0 | 6 | 2 | -8 | 8 | ⑭ | ② | 8 |
| -10 | -4 | -4 | -14 | -10 | 4 | 4 | -14 |
| -8 | -10 | 14 | -4 | 0 | ⑭ | 6 | 4 |
| -4 | -6 | 10 | -8 | 0 | -10 | 6 | 12 |
| -10 | ⑫ | ⑫ | 2 | ② | 8 | 8 | 14 |

Fig. 22

CORRECTED DEQUANT. HADAMARD'S TRANS. COEF. $A''_{vu}$

| 10280 | 350 | -118 | 160 | 20 | 18 | -42 | 100 |
|---|---|---|---|---|---|---|---|
| -554 | 252 | -16 | 86 | 10 | -64 | -36 | 18 |
| 18 | -40 | 4 | -38 | -14 | 0 | 36 | 2 |
| -272 | 102 | 2 | -8 | 8 | -2 | 66 | |
| -10 | -36 | -4 | -14 | -26 | 4 | 4 | -14 |
| -8 | -26 | 14 | -52 | 16 | 30 | 6 | |
| -20 | -22 | 10 | -8 | 0 | -10 | 38 | |
| -122 | 60 | 12 | | 2 | | | |

Fig. 23

| KNOWN $M^{32}_{vu}$ | OBTAINED $M^{32}_{vu}$ |
|---|---|
| $M^{32}_{00}$, $M^{32}_{20}$, $M^{32}_{40}$, $M^{32}_{60}$<br>$M^{32}_{02}$, $M^{32}_{22}$, $M^{32}_{42}$, $M^{32}_{62}$<br>$M^{32}_{04}$, $M^{32}_{24}$, $M^{32}_{44}$, $M^{32}_{64}$<br>$M^{32}_{06}$, $M^{32}_{26}$, $M^{32}_{46}$, $M^{32}_{66}$<br>$M^{32}_{10}$, $M^{32}_{30}$, $M^{32}_{50}$, $M^{32}_{70}$<br>$M^{32}_{12}$, $M^{32}_{32}$, $M^{32}_{52}$, $M^{32}_{72}$<br>$M^{32}_{14}$, $M^{32}_{34}$, $M^{32}_{54}$, $M^{32}_{74}$<br>$M^{32}_{16}$, $M^{32}_{36}$, $M^{32}_{56}$ | $M^{32}_{76}$ |
| $M^{32}_{01}$, $M^{32}_{03}$, $M^{32}_{05}$, $M^{32}_{07}$<br>$M^{32}_{03}$, $M^{32}_{23}$, $M^{32}_{43}$, $M^{32}_{63}$<br>$M^{32}_{05}$, $M^{32}_{25}$, $M^{32}_{45}$, $M^{32}_{65}$<br>$M^{32}_{07}$, $M^{32}_{27}$, $M^{32}_{47}$ | $M^{32}_{67}$ |
| $M^{32}_{11}$, $M^{32}_{31}$, $M^{32}_{51}$, $M^{32}_{71}$<br>$M^{32}_{13}$, $M^{32}_{33}$, $M^{32}_{53}$ | $M^{32}_{73}$ |
| $M^{32}_{15}$, $M^{32}_{35}$, $M^{32}_{55}$ | $M^{32}_{75}$ |
| $M^{32}_{17}$ | $M^{32}_{37}$, $M^{32}_{57}$, $M^{32}_{77}$ |

Fig. 24

REMAINDERS $M^{32}_{vu}$

| 8 | 30 | -22 | 0 | 20 | 18 | -10 | 4 |
|---|---|---|---|---|---|---|---|
| -10 | 28 | -16 | 22 | 10 | 0 | -4 | 18 |
| 18 | -8 | 4 | -6 | -14 | 0 | 4 | 2 |
| -16 | 6 | 2 | -8 | 8 | 30 | 2 | (8) |
| -10 | -4 | -4 | -14 | -26 | 4 | 4 | -14 |
| -8 | -26 | 14 | -20 | 16 | 30 | 6 | (20) |
| -20 | -22 | 10 | -8 | 0 | -10 | 6 | (28) |
| -26 | 28 | 12 | (2) | 2 | (8) | (8) | 14 |

Fig. 25

CORRECTED DEQUANT. HADAMARD'S TRANS. COEF. $A''_{vu}$

| 10280 | 350 | -118 | 160 | 20 | 18 | -42 | 100 |
|---|---|---|---|---|---|---|---|
| -554 | 252 | -16 | 86 | 10 | -64 | -36 | 18 |
| 18 | -40 | 4 | -38 | -14 | 0 | 36 | 2 |
| -272 | 102 | 2 | -8 | 8 | -2 | 66 | 8 |
| -10 | -36 | -4 | -14 | -26 | 4 | 4 | -14 |
| -8 | -26 | 14 | -52 | 16 | 30 | 6 | -12 |
| -20 | -22 | 10 | -8 | 0 | -10 | 38 | -4 |
| -122 | 60 | 12 | 2 | 2 | 8 | 8 | |

Fig. 26

REMAINDERS $M^{64}_{VU}$

| 40  | 30  | -54 | 32  | 20  | 18  | -42 | 36  |
|-----|-----|-----|-----|-----|-----|-----|-----|
| -42 | 60  | -16 | 22  | 10  | 0   | -36 | 18  |
| 18  | -40 | 4   | -38 | -14 | 0   | 36  | 2   |
| -16 | 38  | 2   | -8  | 8   | 62  | 2   | 8   |
| -10 | -36 | -4  | -14 | -26 | 4   | 4   | -14 |
| -8  | -26 | 14  | -52 | 16  | 30  | 6   | 52  |
| -20 | -22 | 10  | -8  | 0   | -10 | 38  | 60  |
| -58 | 60  | 12  | 2   | 2   | 8   | 8   | (14)|

Fig. 27

CORRECTED DEQUANT. HADAMARD'S TRANS. COEF. $A''_{VU}$

| 10280 | 350 | -118 | 160 | 20  | 18  | -42 | 100 |
|-------|-----|------|-----|-----|-----|-----|-----|
| -554  | 252 | -16  | 86  | 10  | -64 | -36 | 18  |
| 18    | -40 | 4    | -38 | -14 | 0   | 36  | 2   |
| -272  | 102 | 2    | -8  | 8   | -2  | 66  | 8   |
| -10   | -36 | -4   | -14 | -26 | 4   | 4   | -14 |
| -8    | -26 | 14   | -52 | 16  | 30  | 6   | -12 |
| -20   | -22 | 10   | -8  | 0   | -10 | 38  | -4  |
| -122  | 60  | 12   | 2   | 2   | 8   | 8   | 14  |

IMAGE COMPRESSION AND EXPANSION DEVICE

BACKGROUND OF THE INVENTION

1. Field of the Invention

The present invention is related to an image compression device by which color still image data is compressed in accordance with an Hadamard's transformation, and also to an image expansion device by which the compressed image data is expanded in accordance with an inverse Hadamard's transformation.

2. Description of the Related Art

A standard algorithm, for the encoding of high resolution images and the transfer of that information through telecommunication transmission channels, has been recommended by the JPEG (Joint Photographic Expert Group). In the JPEG system, a large-scale data compression is performed as follows: the original image data represented by pixel values are divided into a plurality of 8×8 blocks, each of which is subjected to a two dimensional discrete cosine transformation (DCT), so that the original image data are broken down into components on a spatial frequency axis. The components expressed on the spatial frequency axis are quantized by using a quantization table, and are then encoded to become compressed image data.

Although the image data are compressed with a high efficiency by the JPEG system, the image compression is performed using a non-reversible method in which an error exists between the original image data and reproduced image data, which are obtained by expanding the compressed image data. Conversely, for a reversible method in which no error exists between the original image data and the reproduced image data, an image compression using an Hadamard's transformation can be utilized. In the Hadamard's transformation system, the image data is converted or inversely-converted using a symmetric matrix, which is constructed only of components 1 and −1, and the Hadamard's transformation can be performed only by addition and subtraction calculations.

In the Hadamard's transformation, however, in comparison with the JPEG system, the compression ratio is low, and thus the amount of compressed image data is large, which presents a disadvantage when recording and transmitting the compressed image data.

SUMMARY OF THE INVENTION

Accordingly, an object of the present invention is to provide an image compression device and an image expansion device in which original image data are compressed with a reversible method, such that the size of the compressed image data is small, and are expanded.

According to the present invention, there is provided an image compression device comprising an Hadamard's transformation processor and a quantization processor.

The Hadamard's transformation processor applies an Hadamard's transformation to image data inputted to the image compression device to obtain Hadamard's transformation coefficients corresponding to the image data. The quantization processor quantizes the Hadamard's coefficients by a quantization table composed of quantization coefficients, each of which is to the power of 2, to obtain quantized Hadamard's transformation coefficients.

Further, according to the present invention, there is provided an image expansion device comprising an inverse quantization processor, a corrected coefficient generating processor and an image data reproducing processor.

The inverse quantization processor dequantizes quantized Hadamard's transformation coefficients by using a quantization table composed of quantization coefficients, each of which is to the power of 2, to obtain dequantized Hadamard's transformation coefficients. The corrected coefficient generating processor obtains corrected dequantized Hadamard's transformation coefficients, each of which has the same value as each of Hadamard's transformation coefficients, based on the dequantized Hadamard's transformation coefficients. The image data reproducing processor applies inverse Hadamard's transformation to the corrected dequantized Hadamard's transformation coefficients to reproduce image data.

BRIEF DESCRIPTION OF THE DRAWINGS

The present invention will be better understood from the description of the preferred embodiments of the invention set forth below, together with the accompanying drawings, in which:

FIGS. 6A and 6B are views showing quantized HadamArd's transformation coefficients $B_{vu}$, dequantized Hadamard's transformation coefficients $A'_{vu}$, corrected dequantized Hadamard's transformation coefficients $A''_{vu}$, inverse Hadamard's transformation coefficients $P'_{yx}$ and quantization coefficients $Q_{vu}$;

FIGS. 7A and 7B show a flowchart of a program, by which a corrected dequantized Hadamard's transformation coefficient generating process is performed;

FIG. 12 is a table showing the remainders $M^2_{vu}$, which are generated when the Hadamard's transformation coefficients $A_{vu}$ shown in FIG. 3 are divided by 2;

FIG. 13 is a table showing corrected dequantized Hadamard's transformation coefficients $A''_{vu}$ obtained by a first corrected coefficient generating process;

FIG. 14 is a table showing known remainders $M^4_{vu}$ and unknown remainders $M^4_{vu}$, which can be obtained based on the known remainders $M^4_{vu}$;

FIG. 15 is a table showing the remainders $M^4_{vu}$ of the Hadamard's transformation coefficients $A_{vu}$ shown in FIG. 3, in a form of an 8×8 matrix;

FIG. 16 is a table showing the corrected dequantized Hadamard's transformation coefficients $A''_{vu}$ in a form of an 8×8 matrix;

FIG. 17 is a table showing known remainders $M^8_{vu}$ and unknown remainders $M^8_{vu}$, which can be obtained based on the known remainders $M^8_{vu}$;

FIG. 18 is a table showing the remainders $M^8_{vu}$ of the Hadamard's transformation coefficients $A_{vu}$ shown in FIG. 3, in a form of an 8×8 matrix;

FIG. 19 is a table showing the corrected dequantized HadamArd's transformation coefficients $A''_{vu}$ in a form of an 8×8 matrix;

FIG. 20 is a table showing known remainders $M^{16}_{vu}$ and unknown remainders $M^{16}_{vu}$, which can be obtained based on the known remainders $M^{16}_{vu}$;

FIG. 21 is a table showing the remainders $M^{16}_{vu}$ of the Hadamard's transformation coefficients $A_{vu}$ shown in FIG. 3, in a form of an 8×8 matrix;

FIG. 22 is a table showing the corrected dequantized Hadamard's transformation coefficients $A''_{vu}$ in a form of an 8×8 matrix;

FIG. 23 is a table showing known remainders $M^{32}_{vu}$ and unknown remainders $M^{32}_{vu}$, which can be obtained based on the known remainders $M^{32}_{vu}$;

FIG. 24 is a table showing the remainders $M^{32}_{vu}$ of the Hadamard's transformation coefficients $A_{vu}$ shown in FIG. 3, in a form of an 8×8 matrix;

FIG. 25 is a table showing the corrected dequantized Hadamard's transformation coefficients $A''_{vu}$ in a form of an 8×8 matrix;

FIG. 26 is a table showing the remainders $M^{64}_{vu}$ of the Hadamard's transformation coefficients $A_{vu}$ shown in FIG. 3, in a form of an 8×8 matrix; and FIG. 27 is a table showing the corrected dequantized Hadamard's transformation coefficients $A''_{vu}$ in a form of an 8×8 matrix.

DESCRIPTION OF THE PREFERRED EMBODIMENTS

Figure 1:
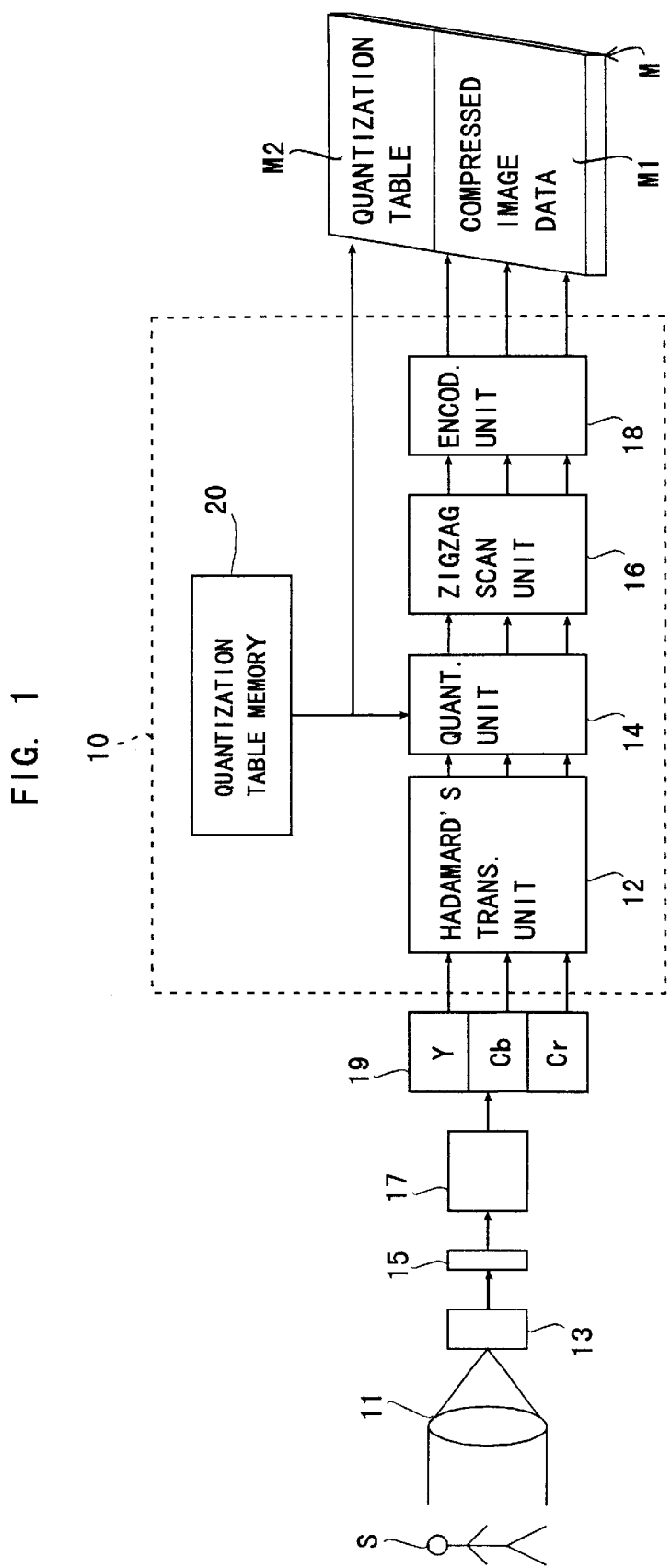
FIG. 1 is a block diagram showing an image compression device of an embodiment of the present invention.

The present invention will be described below with reference to embodiments shown in the drawings.

FIG. 1 is a block diagram of an image compression device of an embodiment of the present invention.

Light reflected by an object S passes through a photographing optical system 11 and enters a dichroic optical system 13, so that the light is color-separated into a red (R) component, a green (G) component and a blue (B) component. These components enter light receiving surfaces of imaging devices 15, such as CCDs (charge coupled devices), so that R, G and B image images are formed thereon to generate R, G and B image signals corresponding to a still image of the object S. Note that, although only one imaging device 15 is indicated in the drawing, three imaging devices 15 are actually provided to face the dichroic optical system 13.

Figure 3:
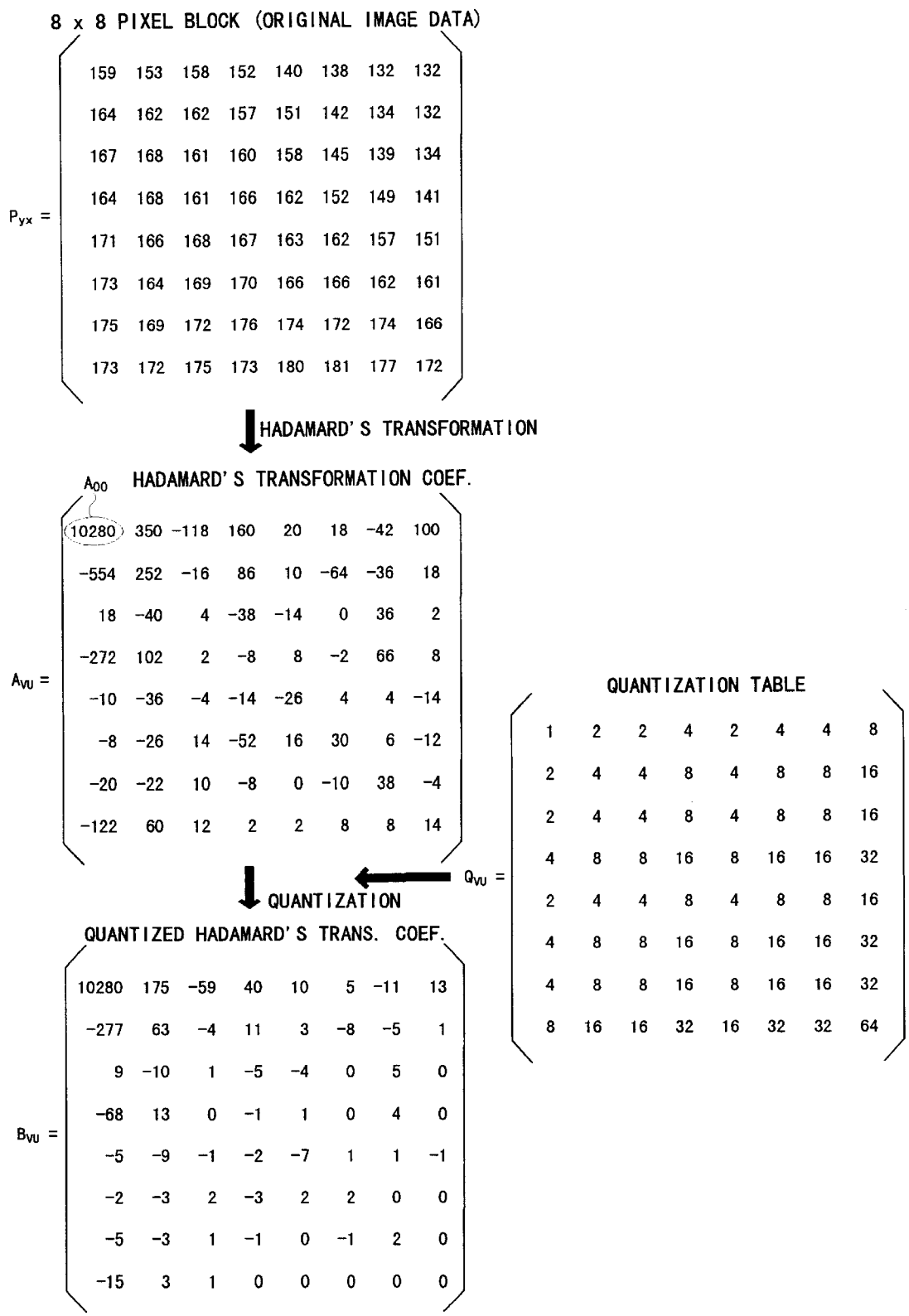
FIG. 3 is a view showing luminance data $P_{yx}$ of the original image, Hadamard's transformation coefficients $A_{vu}$, quantized Hadamard's transformation coefficients $B_{vu}$ and quantization coefficients $Q_{vu}$.

The R, G and B image signals are converted to digital R, G and B image data, respectively, by an A/D converter (not shown), and are then inputted into the image signal processing unit 17, in which the digital R, G and B image data are subjected to a predetermined process, and converted to luminance data Y and color differential data Cb and Cr, which are stored in an image memory 19. The image memory 19 is divided into a plurality of memory areas so that the luminance data Y and the color differential data Cb and Cr are stored separately from each other, and each of the memory areas has a capacity of one frame's worth of image data. The luminance data Y and the color differential data Cb and Cr are inputted to an image compression device 10 as original image data. Each of the luminance data Y and the color differential data Cb and Cr forms a matrix as shown in FIG. 3.

The image compression device 10 has an Hadamard's transformation unit 12, a quantization unit 14, a zigzag scanning unit 16, an encoding unit 18 and a quantization table memory 20. The luminance data Y and the color differential data Cb and Cr are subjected to an Hadamard's transformation and are changed to Hadamard's transformation coefficients for every spatial frequency. The Hadamard's transformation coefficients of the luminance data Y and the color differential data Cb and Cr are quantized in the quantization unit 14, using a quantization table (see FIG. 2) stored in the quantization table memory 20, so that the data Y, Cb and Cr are changed to quantized Hadamard's transformation coefficients.

The quantized Hadamard's transformation coefficients of the luminance data Y and the color differential data Cb and Cr are zigzag-scanned in the zigzag scanning unit 16, so that the matrix data of the quantized Hadamard's transformation coefficients are changed to one dimensional data. Then, the quantized Hadamard's transformation coefficients are encoded or compressed in the encoding unit 18, so that compressed image data are obtained. The compressed image data are recorded in a compressed image data recording area M1 of a recording medium M. The quantization table used in the quantization unit 14 is recorded in a table recording area M2 of the recording medium M.

Figure 2:
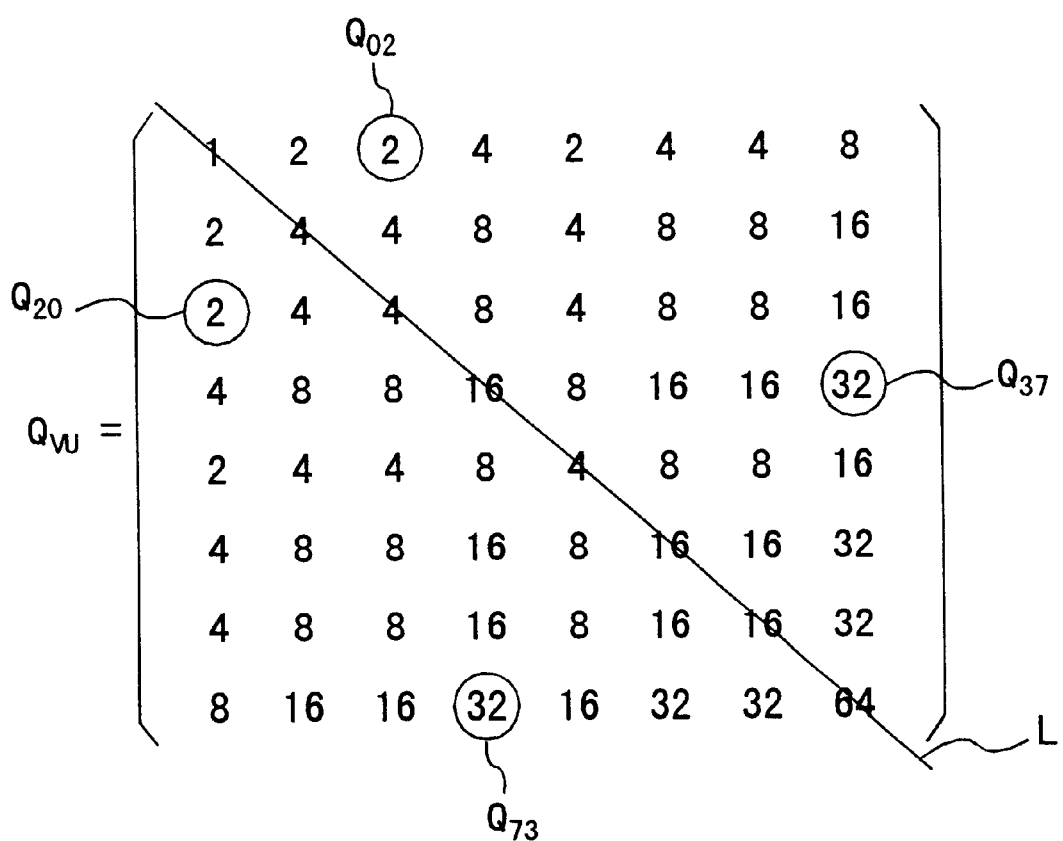
FIG. 2 is a view showing a quantization table.

FIG. 2 shows the quantization table Q stored in the quantization table memory 20. Quantization coefficients $Q_{vu}$ are represented as an 8×8 matrix. Coefficients $Q_{vu}$ are represented as being to the power of 2. Namely, $Q_{00}$, positioned at the left-upper corner of the matrix, is zero to the power of 2 (i.e. 1), and the other coefficients $Q_{vu}$ (i.e. other than $Q_{00}$), which are greater than or equal to 1, are also represented as being to the power of 2. Further, the coefficients $Q_{vu}$ (v≠u) are symmetrically arranged about a diagonal line L, which descends rightward, in such a manner that, for example, $Q_{02}$ (=2) and $Q_{20}$ (=2) have the same values and $Q_{37}$ (=32) and $Q_{73}$ (=32) have the same values. In other words, the diagonal line L is defined as connecting the coefficients $Q_{vu}$, having identical-value parameters "u" and "v" (i.e. $Q_{00}$, $Q_{11}$, $Q_{22}$, ... $Q_{77}$), in a direction in which "u" and "v" become greater or smaller.

With reference to FIG. 3, the Hadamard's transformation is described below.

FIG. 3 shows, as an example, the original image data $P_{yx}$ of an 8×8 pixel block, i.e. luminance data $P_{yx}$, Hadamard's transformation coefficients $A_{vu}$, quantized Hadamard's transformation coefficients $B_{vu}$ and quantization coefficients $Q_{vu}$. In the luminance data $P_{yx}$, the suffix "y" indicates the vertical position in the 8×8 pixel block, and values of "y" (0, 1, 2, ... 7) ascend from the upper-position to the lower-position. The suffix "x" indicates the horizontal position in the 8×8 pixel block, and values of "x" (0, 1, 2, ... 7) ascend from the left-position to the right-position. The suffixes "v" and "u" correspond to the vertical and horizontal positions of 64 Hadamard's transformation coefficients which are arranged in an 8×8 matrix. Values of "v" (0, 1, 2, ... 7) ascend from the upper-position to the lower-position. Values of Eub (0, 1, 2, ... 7) ascend from the left-position to the right-position.

The original image data P are converted to 64 (8×8) Hadamard's transformation coefficients $A_{vu}$ by the Hadamard's transformation in the Hadamard's transformation unit 12. The Hadamard's transformation is indicated by the following equation (1).

$$Avu = 8 \times \sum_{x=0}^{7} \sum_{y=0}^{7} Pyx \times Hux \times Hvy \qquad (1)$$

wherein $$Hux = Hvy = \frac{1}{2\sqrt{2}}$$

or $$= -\frac{1}{2\sqrt{2}}$$

$$H = \frac{1}{2\sqrt{2}} \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix}$$

Note that, in equation (1), $H_{ux}$ and $H_{vy}$ correspond to the matrix H. Namely, $H_{ux}$ and $H_{vy}$ are $$\left(\frac{1}{2\sqrt{2}}\right) \text{ or } \left(-\frac{1}{2\sqrt{2}}\right).$$

In matrix $H_{ux}$, the suffixes "u" and "x" of H indicate vertical and horizonal positiions of each of the components of the matrix H, respectively. The suffix "u" is 0, 1, 2, . . . 7 from the upper-position to the lower-position, and the suffix "x" is 0, 1, 2, . . . 7 from the left-position to the right-position. For example, when u=5 and x=3, the component of the matrix H is 1, and $$H_{ux} = \left(\frac{1}{2\sqrt{2}}\right).$$

Similarly, with $H_{vy}$, the suffixes "v" and "y" indicate vertical and horizontal positions of each of the components of the matrix H, respectively. The suffix "v" is 0, 1, 2, . . . 7 from the upper-position to the lower-position, and the suffix "y" is 0, 1, 2, . . . 7 from the left-position to the right-position.

Of the 64 Hadamard's transformation coefficients, the Hadamard's transformation coefficient $A_{00}$ at the position (0,0) is the DC (Direct Current) component, while the remaining 63 Hadamard's transformation coefficients $A_{vu}$ are the AC (Alternating Current) components. The AC components show how many higher spatial frequency components there are in the 8×8 pixel block of image data from the coefficients $A_{01}$ and $A_{10}$ to the coefficient $A_{77}$. The DC component shows the average value of the spatial frequency components of the 8×8 pixel block as a whole. Namely, each Hadamard's transformation coefficient corresponds to a predetermined spatial frequency.

The quantization table is composed of 64 quantization coefficients $Q_{vu}$. The equation for quantizing the Hadamard's transformation coefficients $A_{vu}$, using the quantization table, is defined by the following equation (2).

$$B_{vu} = \text{round}(A_{vu}/Q_{vu}) \qquad (2)$$

The term "round", in this equation, is an approximation function which approximates, to the nearest integer, the value of the argument. Namely, the quantized Hadamard's transformation coefficients $B_{vu}$ are obtained by dividing the Hadamard's transformation coefficients $A_{vu}$ by the corresponding quantization coefficients $Q_{vu}$, and rounding off.

For example, Hadamard's transformation coefficient $A_{13}$ (=86) is divided by the quantization coefficient $Q_{13}$ (=8), and rounded off, and thus, the quantized Hadamard's transformation coefficient $B_{13}$ (=11) is obtained.

Figure 4:
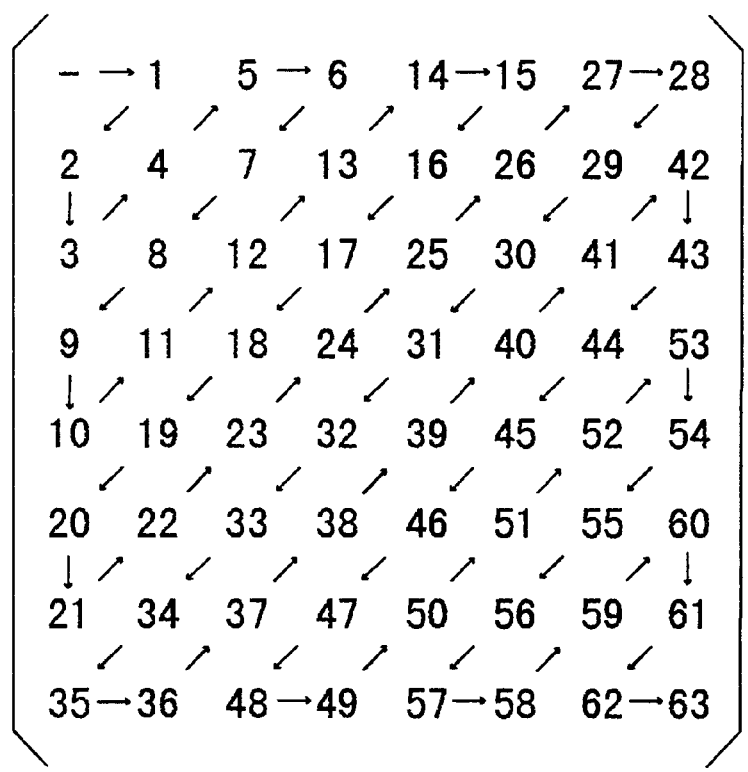
FIG. 4 is a view showing an order of a zigzag-scanning.

FIG. 4 shows an order in which the quantized Hadamard's transformation coefficients $A_{vu}$ are zigzag-scanned. The quantized Hadamard's transformation coefficients $A_{vu}$ are obtained in the quantization unit 14, are read in the order shown in FIG. 4 in the zigzag-scanning unit 16, are encoded according to a Huffman encoding in the encoding unit 18, and are recorded in the recording medium M. Since the Huffman encoding is well known, a detailed explanation thereof is omitted in this specification.

Figure 5:
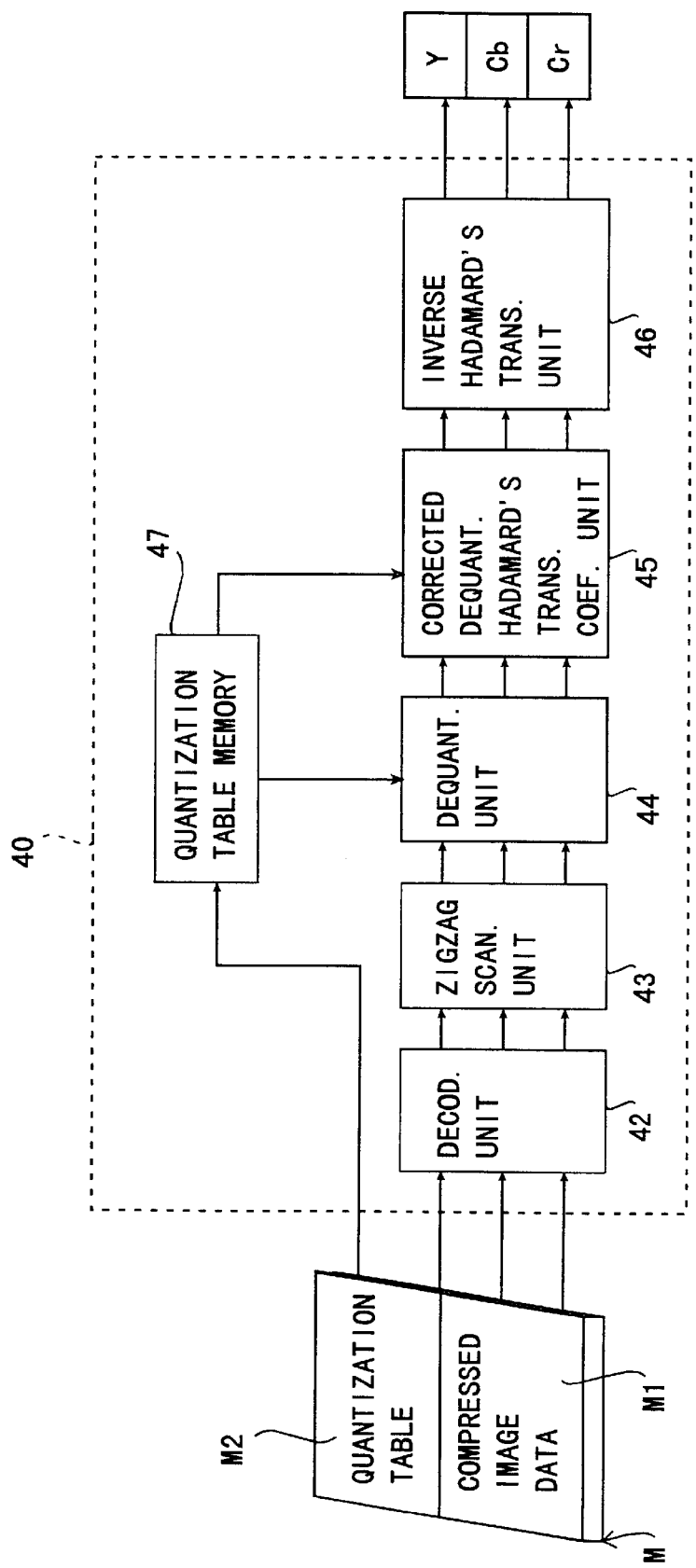
FIG. 5 is a block diagram showing an image expansion device of the embodiment.

FIG. 5 shows a block diagram showing a general construction of an image expansion device of the embodiment of the present invention.

The compressed image data of the luminance data Y and the color differential data Cb and Cr, which are read from the recording medium M, are inputted to the image expansion device 40. The image expansion device 40 has a decoding unit 42, a zigzag scanning unit 43, a dequantization unit 44, a corrected dequantized Hadamard's transformation coefficient generating unit 45, an inverse Hadamard's transformation unit 46 and a quantization table memory 47.

The compressed image data of the luminance data Y and the color differential data Cb and Cr are decoded, in the decoding unit 42, and are converted to the quantized Hadamard's transformation coefficients. The decoding is the inverse of the Huffman encoding, which is well known. The quantized Hadmard's transformation coefficients obtained by the decoding are zigzag-scanned in the zigzag scanning unit 43, so that the quantized Hadamard's transformation coefficients are rearranged back into a two-dimensional matrix. Then, the quantized Hadamard's transformation coefficients are dequantized by the quantization table, which was previously used in the quantization unit 14 in the image compression device 10 and was stored in the quantization table memory 47, so that inverse quantized Hadamard's transformation coefficients are obtained. The inverse quantized Hadamard's transformation coefficients are then corrected in the corrected dequantized Hadamard's transformation coefficient generating unit 45, and are subjected to an inverse Hadamard's transformation in the inverse Hadamard's transformation unit 46, so that the luminance data Y and the color difference data Cb and Cr are reproduced.

FIGS. 6A and 6B show the quantized Hadamard's transformation coefficients Be outputted from the decoding unit 42 and arranged into a two-dimensional matrix by the zigzag-scanning unit 43, dequantized Hadamard's transformation coefficients $A'_{vu}$ obtained by the dequantization unit 44, corrected dequantized Hadamard's transformation coefficients $A''_{vu}$ obtained by the corrected dequantized Hadamard's transformation coefficient generating unit 45, inverse Hadamard's transformation coefficients $P'_{yx}$ obtained by the inverse Hadamard's transformation unit 46, and the quantization coefficients $Q_{vu}$.

With reference to FIGS. 5, 6A and 6B, the dequantization performed in the dequantization unit 44, the generation of the corrected dequantized Hadamard's transformation coefficients performed in the corrected dequantized Hadamard's transformation coefficient generating unit 45, and the inverse Hadamard's transformation performed in the inverse Hadamard's transformation unit 46, are described.

In the recording medium M, the compressed image data and the quantization table are recorded. The compressed image data are decoded by the decoding unit 42, so that the quantized Hadamard's transformation coefficients $B_{vu}$ are outputted therefrom. The quantization table is read from the recording medium M, and stored in the quantization table memory 47.

The quantized Hadamard's transformation coefficients $B_{vu}$ outputted from the zigzag scanning unit 43 are multiplied by the corresponding quantization coefficients $Q_{vu}$ included in the quantization table, in the dequantization unit 44, so that the quantized Hadamard's transformation coefficients $B_{vu}$ are converted to the dequantized Hadamard's transformation coefficients $A'_{vu}$.

In the corrected dequantized Hadamard's transformation coefficient generating unit 45, the corrected dequantized Hadamard's transformation coefficients $A''_{vu}$ are generated based on the dequantized Hadamard's transformation coefficients $A'_{vu}$. By the generating process of the corrected dequantized Hadamard's transformation coefficients in the corrected dequantized Hadamard's transformation coefficient generating unit 45, an error in an Hadamard's transformation coefficient, which is generated by the rounding-off during the quantization and the dequantization, is corrected, as described later. The corrected deqantized Hadamard's transformation coefficients $A''_{vu}$ correspond to the Hadamard's transformation coefficients $A_{vu}$ (FIG. 3).

In the inverse Hadamard's transformation unit 46, the corrected dequantized Hadamard's transformation coefficients $A''_{vu}$ are subjected to the inverse Hadamard's transformation, and are converted to the inverse Hadamard's transformation coefficients $P''_{yx}$, which correspond to the original image data $P_{yx}$, shown in FIG. 3. The inverse Hadamard's transformation is defined by the following equation (3):

$$P'yx = \frac{1}{8} \times \sum_{u=0}^{7}\sum_{v=0}^{7} A''vu \times Hux \times Hvy \qquad (3)$$

wherein $$Hux = Hvy = \frac{1}{2\sqrt{2}}$$

or $$= -\frac{1}{2\sqrt{2}}$$

$$H = \frac{1}{2\sqrt{2}}\begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix}$$

Note that, in equation (3), $H_{ux}$ and $H_{vy}$ correspond to the matrix H. Namely, $H_{ux}$ and $H_{vy}$ are $$\left(\frac{1}{2\sqrt{2}}\right) \text{ or } \left(-\frac{1}{2\sqrt{2}}\right).$$

Similar to equation (1), in $H_{ux}$, the suffixes "u" and "x" indicate vertical and horizontal positions of each of the components of the matrix H, respectively. In $H_{vy}$, the suffixes "v" and "y" indicate vertical and horizontal positions of each of the components of the matrix H, respectively. The suffixes "u" and "v" are 0, 1, 2, . . . 7 from the upper-position to the lower-position, and the suffixes "x" and "y" are 0, 1, 2, . . . 7 from the left-position to the right-position.

With reference to FIGS. 3, 6A and 6B, a quantization error, which occurs due to the quantization and the dequantization, is described.

For example, when an Hadamard's transformation coefficient $A_{13}$ (=86) is applied to equation (2) using the quantization coefficient $Q_{13}$ (=8), the quantized Hadamard's transformation coefficient $B_{13}$ is 11. When the quantized Hadamard's transformation coefficient $B_{13}$ (=11) is multiplied by the quantization coefficient $Q_{13}$ (=8), the dequantized Hadamard's transformation coefficient $A'_{13}$ (=11×8= 88) is obtained. Thus, the difference between the Hadamard's transformation coefficient $A_{13}$ (=86) and the dequantized Hadamard's transformation coefficient $A'_{13}$ (=88) is generated, which is the difference value (88−86=2). Thus, since the remainder is rounded off in the quantization, the quantization error occurs in the expansion of the compressed image data.

In this embodiment, the quantization error is calculated based on each of the quantization coefficients $Q_{vu}$ in the corrected dequantized Hadamard's transformation coefficient generating unit 45, so that the corrected dequantized Hadamard's transformation coefficients $A''_{vu}$, which have no quantization error, are obtained.

Figure 7B:
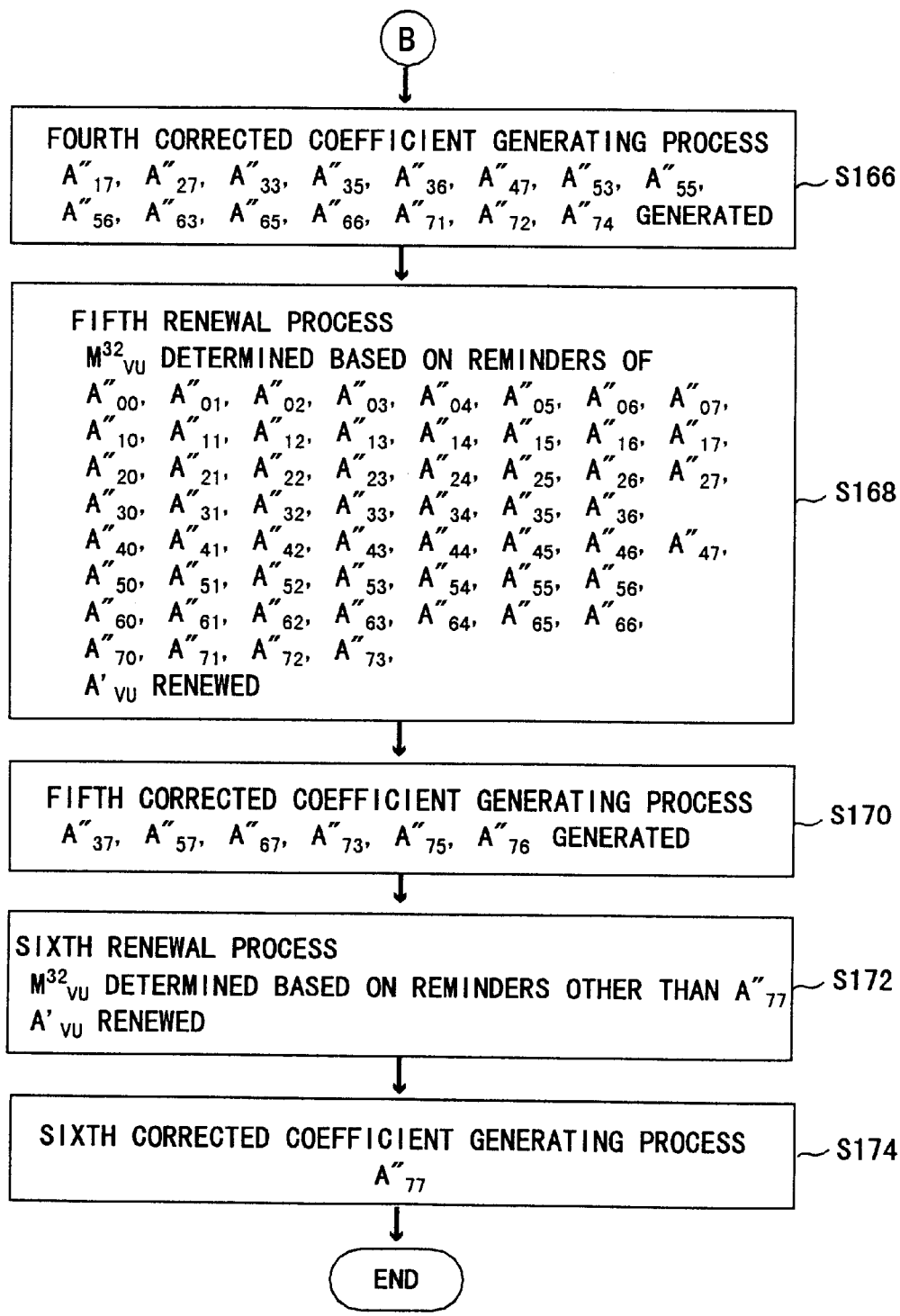
Figure 8:
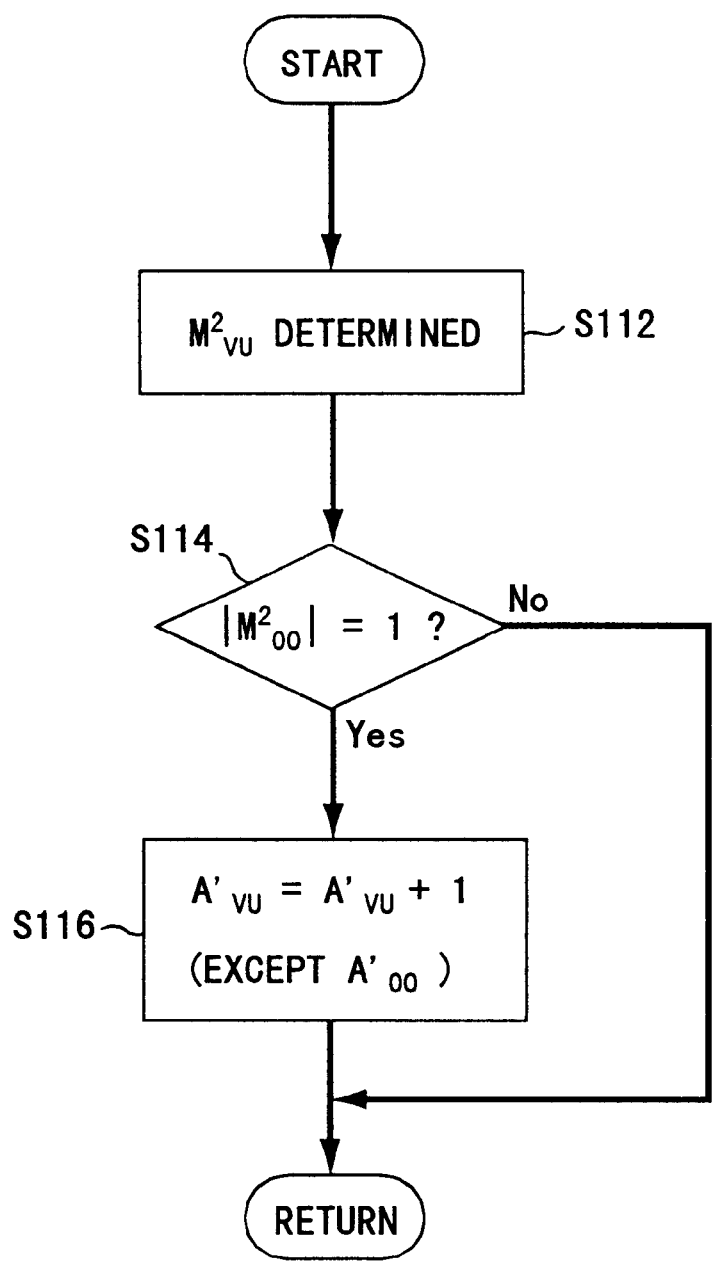
FIG. 8 is a flowchart of a subroutine executed in Step S110 shown in FIG. 7A.
Figure 9:
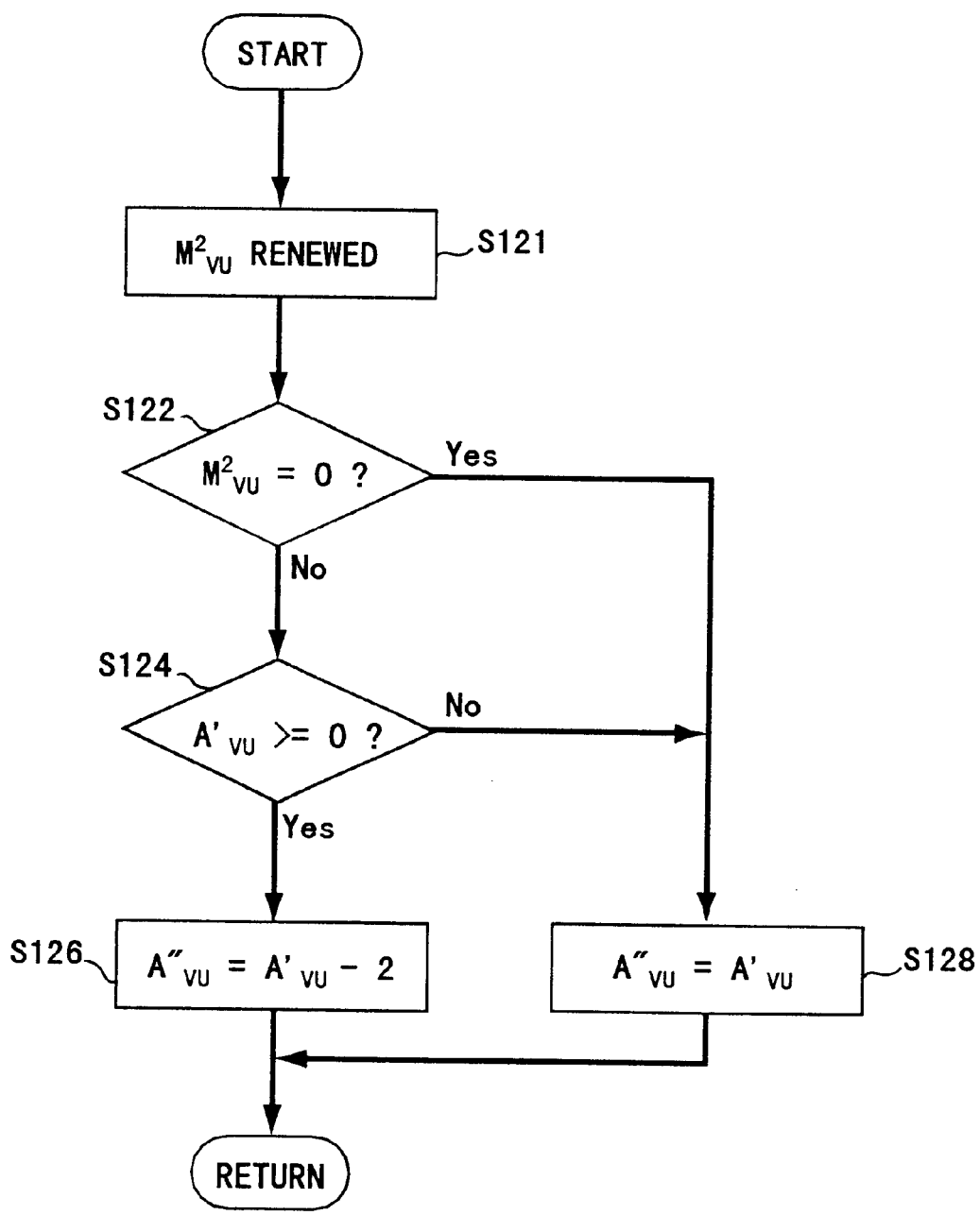
FIG. 9 is a flowchart of a subroutine executed in Step S120 shown in FIG. 7A.
Figure 10:
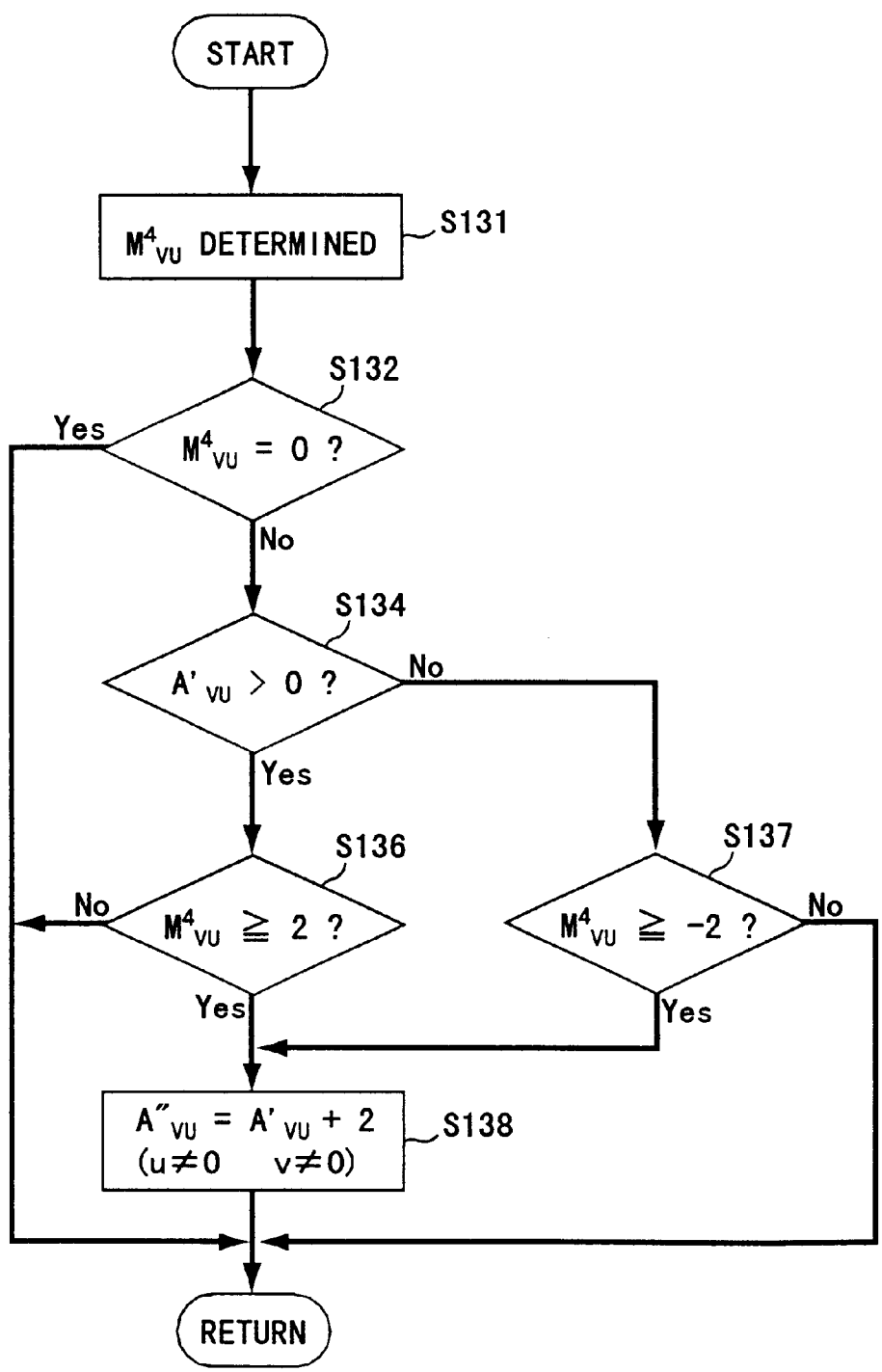
FIG. 10 is a flowchart of a subroutine executed in Step S130 shown in FIG. 7A.
Figure 11:
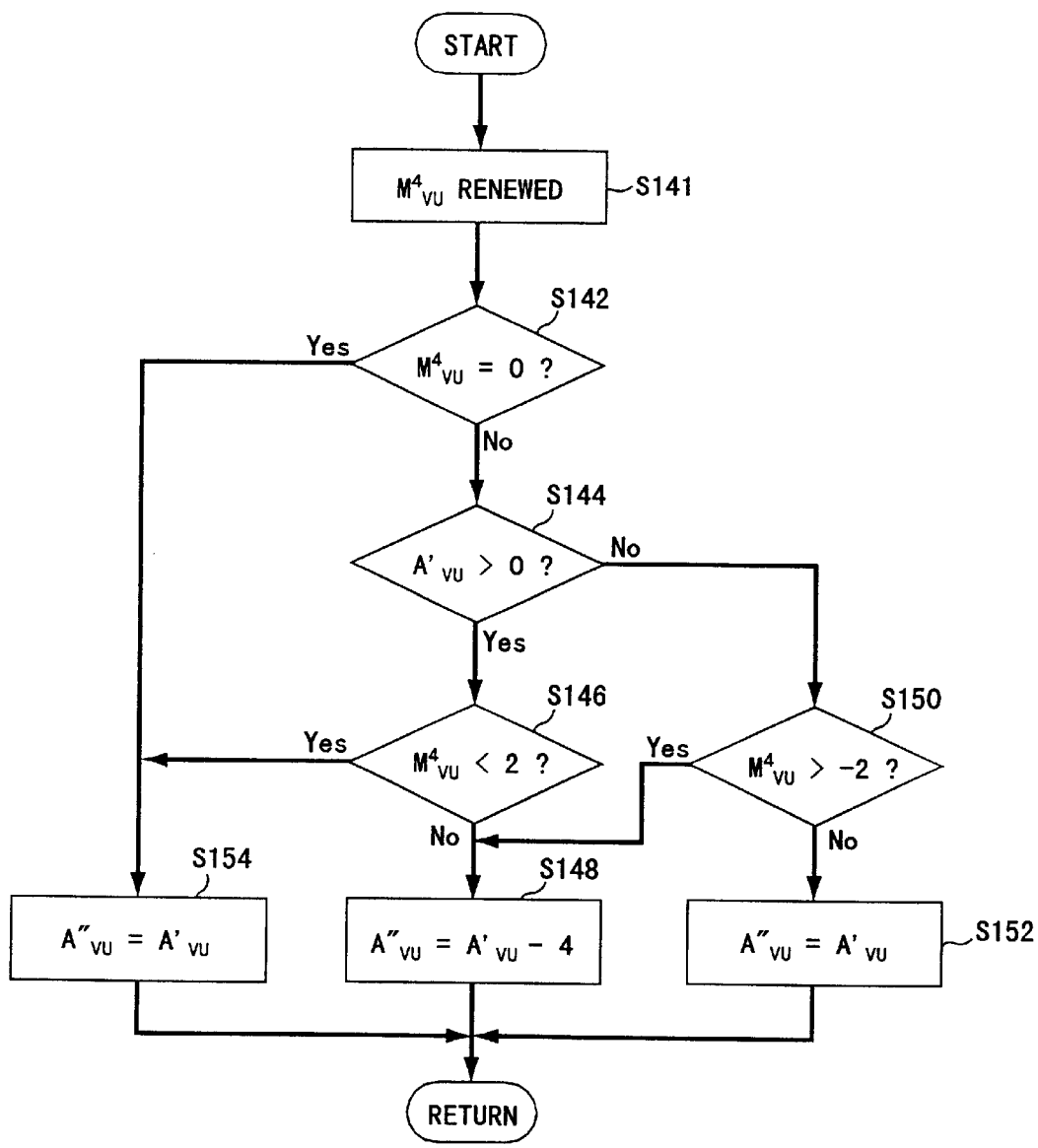
FIG. 11 is a flowchart of a subroutine executed in Step S140 shown in FIG. 7A.

FIGS. 7A and 7B show a flowchart of a program, by which the corrected dequantized Hadamard's transformation coefficient generating process is performed. FIG. 8 shows a flowchart of a subroutine executed in Step S110 shown in FIG. 7A. FIG. 9 shows a flowchart of a subroutine executed in Step S120 shown in FIG. 7A. FIG. 10 shows a flowchart of a subroutine executed in Step S130 shown in FIG. 7A. FIG. 11 shows a flowchart of a subroutine executed in Step S140 shown in FIG. 7A.

In the Hadamard's transformation, each of the components of the matrix H, shown in equation (1) is $$\frac{1}{2\sqrt{2}} \text{ or } -\frac{1}{2\sqrt{2}},$$

and therefore the Hadamard's transformation coefficients $A_{vu}$ can be derived by performing addition and subtraction calculations to the pixel values $P_{yx}$. In the corrected dequantized Hadamard's transformation coefficient generating process, by basing the correction of the dequantized Hadamard's coefficients $A'_{vu}$ on: the characteristics of the Hadamard's transformation; the quantization coefficients $Q_{vu}$ being expressed to the power of 2; a remainder obtained when a dequantized Hadamard's transformation coefficient $A'_{vu}$ is divided by a quantization coefficient $Q_{vu}$ being to the power of 2; and a relationship among each of the dequantized Hadamard's coefficients $A'_{vu}$, the corrected dequantized Hadamard's coefficients $A''_{vu}$ are generated. Note that, in the division carried out in this embodiment, the sign of a remainder is the same as that of a respective dequantized Hadamard's transformation coefficient $A'_{vu}$. For example, the remainder, which occurs when −118 is divided by 4, is −2.

In the corrected dequantized Hadamard's transformation coefficient generating process, first, Step S102 is executed. Since the Hadamard's transformation coefficient $A_{00}$ is first divided and then multiplied by the quantization coefficient $Q_{00}$ (=1) in order to proceed from $A_{00}$ to $A'_{00}$, the dequantized Hadamard's transformation coefficient $A'_{00}$ has always the same value as that of the Hadamard's transformation coefficient $A_{00}$. In other words, there is no error between the Hadamard's transformation coefficient $A_{00}$ and the dequantized Hadamard's transformation coefficient $A'_{00}$. Therefore, in Step S102, the dequantized Hadamard's transformation coefficient $A'_{00}$ is set to the corrected dequantized Hadamard's transformation coefficient $A''_{00}$. For example, as shown in FIGS. 6A and 6B, when the dequantized Hadamard's transformation coefficient $A'_{00}$ is 10280, the corrected dequantized Hadamard's transformation coefficient $A''_{00}$ is set to 10280.

Then, in Step S110, a first renewal process is executed. Namely, by using a remainder $M^2_{00}$, which is generated when the corrected dequantized Hadamard's transformation coefficient $A''_{00}$ is divided by 2, the other 63 dequantized Hadamard's transformation coefficients $A'_{vu}$ (i.e. except A') are renewed, as described later.

FIG. 12 shows the remainders $M^2_{vu}$, which are generated when the Hadamard's transformation coefficients $A_{vu}$ shown in FIG. 3 are divided by 2. The numeral enclosed by a rectangular frame indicates the known remainder $M^2_{vu}$ obtained in Step S102, being $M^2_{00}$ at this time, and each of the numerals enclosed by a circle, corresponding to the respective quantization coefficients $Q_{vu}$ having a value of 2 (see FIG. 3), indicates a remainder $M^2_{vu}$ corresponding to a corrected dequantized Hadamard's transformation coefficient $A''_{vu}$, which is obtained based on the known remainder $M^2_{vu}$ (i.e. $M^2_{00}$).

FIG. 13 shows corrected dequantized Hadamard's transformation coefficients $A''_{vu}$. The numeral enclosed by a rectangular frame indicates the corrected dequantized Haamard's transformation coefficient $A''_{vu}$ which has been obtained before the execution of Step S110 (i.e. $A''_{00}$), and each of the numerals, corresponding to $Q_{vu}=2$, which are not enclosed by a rectangular frame, indicate the corrected dequantized Hadamard's transformation coefficients $A''_{vu}$ which are obtained by the execution of Steps S110 and S120.

A value obtained by adding two arbitrary Hadamard's transformation coefficients $A_{vu}$ is always an even number. Namely, all of the Hadamard's transformation coefficients $A_{vu}$ are either all even numbers or all odd numbers. Further, dequantized Hadamard's transformation coefficients $A'_{vu}$ (other than A') are obtained by multiplying by respective quantization coefficients $Q_{vu}$ being to the power of 2, and thus, the dequantized Hadamard's transformation coefficients $A'_{vu}$ are initially always even numbers. Therefore, when the corrected dequantized Hadamard's transformation coefficient $A''_{00}$ is an even number, no error occurs due to the quantization and dequantization, but when the corrected dequantized Hadamard's transformation coefficient $A''_{00}$ is an odd number, the dequantized Hadamard's transformation coefficients $A'_{vu}$ (other than $A'_{00}$) will possess an error because of the quantization and dequantization.

The first renewal process of Step S110 is performed according to the flowchart shown in FIG. 8. This process is performed 63 times for each block, so that the 63 dequantized Hadamard's transformation coefficients $A'_{vu}$ in each block are renewed.

In Step S112, a remainder $M^2_{vu}$ of a corrected dequantized Hadamard's transformation coefficient $A''_{vu}$ is obtained for the following equation (4):

$$M^2_{00}=A''_{00} \bmod 2 \quad (4)$$

$|M^2_{vu}|=|M^2_{00}|$ (wherein $v \ne 0$ and $u \ne 0$)

Thus, when the absolute value of the remainder $M^2_{00}$ is 1, the other remainders $M^2_{vu}$ are set to 1, and when the absolute value of the remainder $M^2_{00}$ is 0, the other remainders $M^2_{vu}$ are set to 0.

In Step S114, it is determined whether the absolute value of the remainder $M^2_{00}$ is 1, i.e. whether the corrected dequantized Hadamard's transformation coefficient $A''_{00}$ is an odd number. When the absolute value of the remainder $M^2_{00}$ is 1, Step S116 is executed in which 1 is added to the dequantized Hadamard's transformation coefficients $A'_{vu}$ (except $A'_{00}$), so that the dequantized Hadamard's transformation coefficients $A'_{vu}$ are renewed, and thus, the first renewal process ends. Conversely, when the absolute value of the remainder $M^2_{00}$ is not 1, Step S116 is skipped so that the dequantized Hadamard's transformation coefficients $A'_{vu}$ (including $A'_{00}$) remain at the present values, and thus, the first renewal process ends.

For example, when the corrected dequantized Hadamard's transformation coefficient $A''_{00}$ is 10280, as shown in FIG. 6B, all of the remainders $M^2_{vu}$ are set to 0, as shown in FIG. 12, and the values of the dequantized Hadamard's transformation coefficients $A'_{vu}$ are not changed. Conversely, when the corrected dequantized Hadamard's transformation coefficient $A''_{00}$ is an odd number, such as 10389, all of the remainders $M^2_{vu}$ are set to 1, and 1 is added to all of the other dequantized Hadamard's transformation coefficients $A'_{vu}$, which are even numbers. Thus, the other dequantized Hadamard's transformation coefficients $A'_{vu}$ are changed to odd numbers.

After the execution of Step S110, Step S120 is executed in which a first corrected coefficient generating process is executed, so that six corrected dequantized Hadamarda's transformation coefficients $A''_{01}$, $A''_{02}$, $A''_{04}$, $A''_{10}$, $A''_{20}$ and $A''_{40}$, corresponding to $Q_{vu}=2$, are generated based on the dequantized Hadamard's transformation coefficients $A'_{vu}$, which have been renewed in Step S110, and the remainder $M^2_{vu}$, as shown in FIG. 13.

Six dequantized Hadamard's transformation coefficients $A'_{01}$, $A'_{02}$, $A'_{04}$, $A'_{10}$, $A'_{20}$, $A'40$ are obtained by quantizing six Hadamard's transformation coefficients $A_{01}$, $A_{02}$, $A_{04}$, $A_{10}$, $A_{20}$, $A_{40}$ and then dequantizing the quantized Hadamard's transformation coefficients $B_{01}$, $B_{02}$, $B_{04}$, $B_{10}$, $B_{20}$, $B_{40}$, using the corresponding quantization coefficients $Q_{01}$, $Q_{02}$, $Q_{04}$, $Q_{10}$, $Q_{20}$, $Q_{40}$. Namely, all six dequantized Hadamard's transformation coefficients $A'_{vu}$ are obtained by dividing the Hadamard's transformation coefficients $A_{vu}$ by 2 (i.e. the corresponding quantization coefficients $Q_{vu}$), rounding off the result, and then multiplying by 2 (i.e. the corresponding quantization coefficient $Q_{vu}$).

Accordingly, when the Hadamard's transformation coefficient $A_{vu}$ is an even number, the Hadamard's transformation coefficient $A_{vu}$ coincides with the corresponding dequantized Hadamard's transformation coefficient $A'_{vu}$. For example, if the Hadamard's transformation coefficient $A_{vu}$ is 16, the corresponding dequantized Hadamard's transformation coefficient $A'_{vu}$ is also 16.

Conversely, when the Hadamard's transformation coefficient $A_{vu}$ is a positive odd number, the Hadamard's transformation coefficient $A_{vu}$ is increased by 1 due to the quantization and the dequantization. Further, due to Step S116, 1 is added to the Hadamard's transformation coefficient $A_{vu}$. Therefore, the dequantized Hadazard's transformation coefficient $A'_{vu}$ becomes greater than the corresponding Hadamard's transformation coefficient $A_{vu}$ by 2. For example, if the Hadamard's transformation coefficient $A_{vu}$ is 15, the dequantized Hadamard's transformation coefficient $A'_{vu}$ becomes 16 via "round 15/2=8" (quantization) and 8×2=16 (dequantization), and then the dequantized Hadamard's transformation coefficient $A'_{vu}$ is increased to 17 due to Step S116.

When the Hadamard's transformation coefficient $A_{vu}$ is a negative odd number, the dequantized Hadamard's transformation coefficient $A'_{vu}$ is decreased by 1 due to the quantization and the dequantization, i.e. the absolute value of the dequantized Hadamard's transformation coefficient $A'_{vu}$ is increased by 1. However, since 1 is added to the dequantized Hadamard's transformation coefficient $A'_{vu}$ in Step S116, similar to the case of the even number, the dequantized Hadamard's transformation coefficient $A'_{vu}$ coincides with the corresponding Hadamard's transformation coefficient $A_{vu}$. For example, if the Hadamard's transformation coefficient $A_{vu}$ is −15, the dequantized Hadamard's transformation coefficient $A'_{vu}$ becomes −16 via "round $\{(-15)/12 = -8$" (quantization) and $(-8) \times 2 = -16$ (dequantization), and the dequantized Hadamard's transformation coefficient $A'_{vu}$ is increased to −15 due to Step S116.

In the first corrected coefficient generating process (Step S120), the calculations described above are executed.

The first corrected coefficient generating process is performed according to the flowchart shown in FIG. 9. This process is repeatedly performed so that six corrected dequantized Hadamard's transformation coefficients $A''_{01}$, $A''_{02}$, $A''_{04}$, $A''_{10}$, $A''_{20}$ and $A''_{40}$ are generated.

From Step S121, the 6 remainders $M^2_{vu}$, corresponding to $A'_{01}$, $A'_{02}$, $A'_{04}$, $A'_{10}$, $A'_{20}$, $A'_{40}$, which correspond to the quantization coefficients $Q_{vu}=2$, are renewed (as $M^2_{00}$ remains constant). Namely, the remainders $M^2_{vu}$ are obtained based on the 6 dequantized Hadamard's transformation coefficients $A'_{vu}$ renewed in Step S110 of FIG. 7A, in a similar equation to equation (4), and the remainders $M^2_{vu}$ set in Step S112 of FIG. 8 are replaced with the renewed remainders $M^2_{vu}$, with $M^2_{00}$ remaining constant. From Step S122, it is determined whether the renewed remainders $M^2_{vu}$ are 0. When it is determined that a remainder $M^2_{vu}$ is 0, i.e. that the dequantized Hadamard's transformation coefficient $A'_{vu}$ is an even number, Step S128 is executed in which the corrected dequantized Hadamard's transformation coefficient $A''_{vu}$ is set to the present dequantized Hadamard's transformation coefficient $A'_{vu}$, and this first corrected coefficient generating process ends. Then this process is repeated for the next renewed remainder $M^2_{vu}$.

When it is determined in Step S122 that the remainder $M^2_{vu}$ is not 0, i.e. that the dequantized Hadamard's transformation coefficients $A'_{vu}$ are odd numbers, Step S124 is executed in which it is determined whether the dequantized Hadamard's transformation coefficient $A'_{vu}$ in question is greater than or equal to 0. When the dequantized Hadamard's transformation coefficient $A'_{vu}$ is less than 0, Step S128 is executed. Conversely, when the dequantized Hadamard's transformation coefficient $A'_{vu}$ is greater than or equal to 0, Step S126 is executed in which the value, which is obtained by subtracting 2 from the dequantized Hadamard's transformation coefficient $A'_{vu}$, is set to the corrected dequantized Hadamard's transformation coefficient $A''_{vu}$, and this first corrected coefficient generating process ends. Then this process is repeated for the next renewed remainder $M^2_{vu}$.

For example, when one of the 6 dequantized Hadamard's transformation coefficients $A'_{vu}$ (excluding $A'_{00}$) is −10, Steps S121, S122 and S128 are executed, so that the corrected dequantized Hadamard's transformation coefficient $A''_{vu}$ is set to −10. Alternatively, when one of the 6 dequantized Hadamard's transformation coefficients $A'_{vu}$ (excluding $A'_{00}$) is 17, Steps S121, S122, S124 and S126 are executed, so that the corrected dequantized Hadamard's transformation coefficient $A''_{vu}$ is set to 15, which coincides with the corresponding Hadamard's transformation coefficient $A_{vu}$. Further, when a dequantized Hadamard's transformation coefficient $A'_{vu}$ (excluding $A'_{00}$) is −15, Steps S121, S122, S124 and S128 are executed, so that the corrected dequantized Hadamard's transformation coefficient $A''_{vu}$ is set to −15, which coincides with the corresponding Hadamard's transformation coefficient $A_{vu}$.

Thus, in the first renewal process (Step S110) and the first corrected coefficient generating process (Step S120), the six dequantized Hadamard's transformation coefficients $A'_{vu}$ (excluding $A'_{00}$), which have been quantized by 2, are corrected based on the remainders $M^2_{vu}$, so that six corrected dequantized Hadamard's transformation coefficients $A''_{vu}$ are obtained. The six corrected dequantized Hadamard's transformation coefficients $A''_{vu}$, corresponding to the six quantization coefficients $Q_{vu}$, which are 2, are the same as the corresponding Hadamard's transformation coefficients $A_{vu}$.

In FIG. 7A, after the execution of Step S120, Step S130 is executed in which a second renewal process is executed. Namely, based on remainders $M^4_{vu}$, which are remainders generated when the known seven corrected dequantized Hadamard's transformation coefficients $A''_{vu}$ are divided by 4, and a sum of four corrected dequantized Hadamard's transformation coefficients $A''_{vu}$, the sum being a multiple of 4, remaining 57 remainders $M^4_{vu}$ are obtained. Then, based on these 57 remainders $M^4_{vu}$, the 57 corresponding dequantized Hadamard's transformation coefficients $A'_{vu}$ are renewed. The second renewal process (Step S130) is described below.

Since each of the Hadamard's transformation coefficients $A_{vu}$ are represented by addition and subtraction of pixel values $P_{yx}$, a sum of four coefficients $A_{00}$, $A_{20}$, $A_{02}$ and $A_{22}$, for example, is represented by the following equation (5), in accordance with equation (1). Namely, regardless of the values of the pixel values $P_{yx}$, the sum is a multiple of 4.

$$A_{00} + A_{20} + A_{02} + A_{22} = 4 \times (P_{00} + P_{01} + P_{06} + P_{07} + \quad (5)$$
$$P_{10} + P_{11} + P_{16} + P_{17} +$$
$$P_{60} + P_{61} + P_{66} + P_{67} +$$
$$P_{70} + P_{71} + P_{76} + P_{77})$$

As shown in equation (5), in the sum of the Hadamard's transformation coefficients, which is a multiple of 4, the Hadamard's transformation coefficients $A_{00}$, $A_{20}$ and $A_{02}$, i.e. the corrected dequantized Hadamard's transformation coefficient $A''_{00}$, $A''_{20}$ and $A''_{02}$, have known values due to Steps 102 and 120, and the remainders $M^4_{00}$, $M^4_{20}$ and $M^4_{02}$ are obtained by dividing the corrected dequantized Hadamard's transformation coefficient $A''_{00}$, $A''_{20}$ and $A''_{02}$ by 4. Since the sum of the Hadamard's transformation coefficients $A_{00}$, $A_{20}$, $A_{02}$ and $A_{22}$ is a multiple of 4, a sum of the remainders $M^4_{00}$, $M^4_{20}$, $M^4_{02}$ and $M^4_{22}$ is also a multiple of 4. Therefore, the remainder $M^4_{22}$ of the corrected dequantized Hadamard's transformation coefficient $A''_{22}$ can be obtained.

For example, when the corrected dequantized Hadamard's transformation coefficient $A''_{00}$ is 10280 (i.e. $M^4_{00}$ is 0) the corrected dequantized Hadamard's transformation coefficient $A''_{20}$ is 18 (i.e. $M^4_{20}$ is 2) and the corrected dequantized Hadamard's transformation coefficient $A''_{02}$ is −118 (i.e. $M^4_{02}$ is −2), thus the remainder $M^4_{22}$ is 0. Therefore, by combining four corrected dequantized Hadamard's transformation coefficients $A''_{vu}$, a sum of which is a multiple of 4, 57 corrected dequantized Hadamard's transformation coefficients $A''_{vu}$ can be obtained, as described below.

FIG. 14 is a table showing known remainders $M^4_{vu}$ and unknown remainders $M^4_{vu}$, which can be obtained based on the known remainders $M^4_{vu}$. FIG. 15 shows the 64 remainders $M^4_{vu}$ of the Hadamard's transformation coefficients $A_{vu}$ shown in FIG. 3, in a form of an 8×8 matrix. The remainders $M^4_{vu}$ enclosed by rectangular frames correspond to the known remainders $M^4_{vu}$ indicated in left columns in FIG. 14. The remainders $M^4_{vu}$ enclosed by circles correspond to the 15 corrected dequantized Hadamard's transformation coefficients $A''_{vu}$ which can be obtained in Steps S130 and S140. The positions of the circled remainders $M^4_{vu}$ in the 8×8 matrix correspond to the positions of the quantization coefficients $Q_{vu}$ which are 4. FIG. 16 shows the corrected dequantized Hadamard's transformation coefficients $A''_{vu}$ in a form of an 8×8 matrix. The numerals enclosed by rectangular frames indicate the 7 corrected dequantized Hadamard's transformation coefficients $A''_{vu}$, which have been obtained before the execution of Step S130, and the numerals, which are not enclosed by frames indicate the 15 corrected dequantized Hadamard's transformation coefficients $A''_{vu}$, which are obtained in Steps S130 and S140.

With reference to FIGS. 10, 14, 15 and 16, the contents of the second renewal process (Step S130) are described below. Note that the second renewal process is repeatedly performed for 57 dequantized Hadamard's transformation coefficients $A'_{vu}$, in which the corrected dequantized Hadamard's transformation coefficients $A''_{vu}$ have not been determined.

In the second renewal process, Step S131 is executed in which remainders $M^4_{vu}$, which are generated when 64 corrected dequantized Hadamard's transformation coefficients $A''_{vu}$ are divided by 4, are obtained. First, the remainders $M^4_{vu}$ of the corrected dequantized Hadamard's transformation coefficients $A''_{00}, A''_{01}, A''_{02}, A''_{04}, A''_{10}, A''_{20}$ and $A''_{40}$, which have been obtained in Steps S102 and S120, are obtained according to the following equation (6):

$$M^4_{vu} = A''_{vu} \bmod 4 \qquad (6)$$

wherein $(v, u) = (0, 0), (0, 1), (0, 2), (0, 4), (1, 0), (2, 0), (4, 0).$

The absolute values of the remainders $M^4_{vu}$ of the corrected dequantized Hadamard's transformation coefficients $A''_{vu}$ are 0, 1, 2 or 3, and all of 64 corrected dequantized Hadamard's transformation coefficients $A''_{vu}$ will be either all even numbers or all odd numbers. Accordingly, when the corrected dequantized Hadamard's transformation coefficients $A''_{vu}$ are even numbers, the absolute values of 64 remainders $M^4_{vu}$ are 0 or 2. Conversely, when the corrected dequantized Hadamard's transformation coefficients $A''^{uv}$ are odd numbers, the absolute values of 64 remainders $M^4_{vu}$ are 1 or 3. For example, as shown in FIG. 6B, all of the corrected dequantized Hadamard's transformation coefficients $A''_{vu}$, are even numbers, and thus, the absolute values of the remainders $M^4_{vu}$ are either 0 or 2, as shown in FIG. 15.

The remainder $M^4_{22}$ is obtained based on the remainders $M^4_{00}, M^4_{20}$ and $M^4_{02}$, as described above.

The remainders $M^4_{42}, M^4_{60}$ and $M^4_{62}$ can be generated using the known remainders $M^4_{00}, M^4_{20}, M^4_{02}, M^4_{22}$ or $M^4_{40}$. Namely, the remainder $M^4_{42}$ is obtained based on the remainders $M^4_{00}, M^4_{02}$ and $M^4_{40}$, which are rectangularly arranged. The remainder $M^4_{60}$ is obtained based on the remainders $M^4_{00}, M^4_{20}$ and $M^4_{40}$, which are arranged at every second position in a vertical column in the 8×8 matrix. The remainder $M^4_{62}$ is obtained based on the remainders $M^4_{00}, M^4_{60}$ and $M^4_{02}$, which are rectangularly arranged.

The remainders $M^4_{24}, M^4_{44}, M^4_{64}, M^4_{06}, M^4_{26}, M^4_{46}$ and $M^4_{66}$ can be generated using the known remainders $M^4_{00}, M^4_{20}, M^4_{02}, M^4_{22}, M^4_{40}, M^4_{42}, M^4_{60}, M^4_{62}$ or $M^4_{04}$. Namely, the remainder $M^4_{24}$ is obtained based on the remainders $M^4_{00}, M^4_{20}$ and $M^4_{04}$, which are rectangularly arranged. The remainder $M^4_{44}$ is obtained based on the remainders $M^4_{00}, M^4_{40}$ and $M^4_{04}$, which are rectangularly arranged. The remainder $M^4_{64}$ is obtained based on the remainders $M^4_{00}, M^4_{60}$ and $M^4_{04}$, which are rectangularly arranged. The remainder $M^4_{06}$ is obtained based on the remainders $M^4_{00}, M^4_{02}$ and $M^4_{04}$, which are arranged at every second position in a horizontal row in the 8×8 matrix. In a similar way, the remainders $M^4_{26}, M^4_{46}$ and $M^4_{66}$ can be generated.

The remainders $M^4_{30}, M^4_{50}, M^4_{70}, M^4_{12}, M^4_{32}, M^4_{52}, M^4_{72}, M^4_{14}, M^4_{34}, M^4_{54}, M^4_{74}, M^4_{16}, M^4_{36}, M^4_{56}$ and $M^4_{76}$ can be generated using the known remainders $M^4_{00}, M^4_{20}, M^4_{02}, M^4{22}, M^4_{40}, M^4_{42}, M^4_{60}, M^4_{62}, M^4_{04}, M^4_{24}, M^4_{44}, M^4_{64}, M^4_{06}, M^4_{26}, M^4_{46}, M^4_{66}$ or $M^4_{10}$. The remainder $M^4_{30}$ is obtained based on the remainders $M^4_{00}, M^4_{10}$ and $M^4_{20}$, which are sequentially arranged in a vertical column in the 8×8 matrix. The remainder $M^4_{50}$ is obtained based on the remainders $M^4_{20}, M^4_{30}$ and $M^4_{40}$, which are sequentially arranged in a vertical column in the 8×8 matrix. The remainder $M^4_{70}$ is obtained based on the remainders $M^4_{40}, M^4_{50}$ and $M^4_{60}$, which are sequentially arranged in a vertical column in the 8×8 matrix. The remainder $M^4_{12}$ and the other remainders can be generated using the known remainders, in a similar way as described above.

The remainder $M^4_{11}$ and the other unknown remainders can be generated using the known remainders $M^4_{00}, M^4_{20}, M^4_{02}, M^4_{22}, M^4_{40}, M^4_{42}, M^4_{60}, M_{462}, M^4_{04}, M^4_{24}, M^4_{44}, M^4_{64}, M^4_{06}, M^4_{26}, M^4_{46}, M^4_{66}, M^4_{10}, M^4_{30}, M^4_{50}, M^4_{70}, M^4_{12}, M^4_{12}, M^4_{32}, M^4_{52}, M^4_{72}, M^4_{14}, M^4_{34}, M^4_{54}, M^4_{74}, M^4_{16}, M^4_{36}, M^4_{56}, M^4_{76}$ or $M^4_{01}$. The remainder $M^4_{03}$ is obtained based on the remainders $M^4_{00}, M^4_{01}$ and $M^4_{02}$, which are sequentially arranged in a horizontal row in the 8×8 matrix. The other unknown remainders can be obtained in a similar way as described above.

Thus, the 64 remainders $M^4_{vu}$ are determined in Step S131.

In Steps S132 through S138, the 57 dequantized Hadamard's transformation coefficients $A'_{vu}$ are renewed or changed, based on the absolute value of the corresponding remainder $M^4_{vu}$. When the absolute value of the remainder $M^4_{vu}$ is greater than or equal to 2, i.e. when the absolute value of the remainder $M^4_{vu}$ is greater than or equal to a half of the quantization coefficient $Q_{vu}$ (=4), the absolute value is increased due to the quantization and the dequantization, and thus, the absolute value of the respective dequantized Hadamard's transformation coefficient $A'_{vu}$ becomes greater than the absolute value of the corresponding Hadamard's transformation coefficient $A'_{vu}$. Namely, in Steps S132 through S138, depending on whether the dequantized Hadamard's transformation coefficient $A'_{vu}$ is positive or negative and whether the remainder $M^4_{vu}$ is greater than or equal to 2 or −2, the dequantized Hadamard's transformation coefficients $A'_{vu}$ are classified and renewed.

In Step S132, it is determined whether the remainder $M^4_{vu}$ is equal to 0. When the remainder $M^4_{vu}$ is equal to 0, this routine ends without renewing the dequantized Hadamard's transformation coefficient $A'_{vu}$ in question. Conversely, when the remainder $M^4_{vu}$ is not equal to 0, Step S134 is executed in which it is determined whether the dequantized Hadamard's transformation coefficient $A'_{vu}$ is positive. When the dequantized Hadamard's transformation coefficient $A'_{vu}$ is positive, Step S136 is executed, and when the dequantized Hadamard's transformation coefficient $A'_{vu}$ is negative, Step S137 is executed.

In Step S136, it is determined whether the remainder $M^4_{vu}$ is greater than or equal to 2, i.e. whether the remainder $M^4_{vu}$ is 2 or 3. When the remainder $M^4_{vu}$ is 2 or 3, Step S138 is executed in which 2 is added to the corresponding dequantized Hadamard's transformation coefficient $A'_{vu}$, and the second renewal process ends. Conversely, when the remainder $M^4_{vu}$ is less than 2, it is determined that the remainder $M^4_{vu}$ is 1, and thus the second renewal process ends with the value of the respective dequantized Hadamard's transformation coefficient $A'_{vu}$ being maintained.

In Step S137, it is determined whether the remainder $M^4_{vu}$ is greater than or equal to −2, i.e. whether the remainder $M^4_{vu}$ is −1 or −2. When the remainder $M^4_{vu}$ is −1 or −2, 2 is added to the respective dequantized Hadamard's transformation coefficient $A'_{vu}$ in Step S138, and the second renewal process ends. Conversely, when the remainder $M^4_{vu}$ is less than −2, i.e. when the remainder $M^4_{vu}$ is −3, the second renewal process ends with the value of the dequantized Hadamard's transformation coefficient $A'_{vu}$ in question being maintained.

As described above, only when the remainder $M^4_{vu}$ is 2, 3, −1 or −2, is 2 added to the dequantized Hadamard's transformation coefficient $A'_{vu}$, and when the remainder $M^4_{vu}$ is 0, 1 or −3, the corresponding dequantized Hadamard's transformation coefficient $A'_{vu}$ is not renewed. For example, when the Hadamard's transformation coefficients $A_{vu}$ are 10, 11, −13 and −10, with quantization coefficients of 4, the dequantized Hadamard's transformation coefficients $A'_{vu}$ are 12, 12, −12 and −12, respectively, and in Step S110, the dequantized Hadamard's transformation coefficients $A'_{vu}$ are changed to 12 (remainder $M^4_{vu}$=2), 13 (remainder $M^4_{vu}$=3), −13 (remainder $M^4_{vu}$=−1) and −12 (remainder $M^4_{vu}$=−2), respectively. Then, in Step S138, 2 is added to the dequantized Hadamard's transformation coefficients $A'_{vu}$, which are changed to 14, 15, −11 and −10, respectively. Conversely, when the Hadamard's transformation coefficients $A_{vu}$ are 12, 13, −12 and −11, with quantization coefficients of 4, the dequantized Hadamard's transformation coefficients $A'_{vu}$ are 12, 12, −12 and −12, respectively, and in Step S110, the dequantized Hadamard's transformation coefficients $A'_{vu}$ are changed to 12 (remainder $M^4_{vu}$=0), 13 (remainder $M^4_{vu}$=1), −12 (remainder $M^4_{vu}$=0) and −13 (remainder $M^4_{vu}$=−3), respectively. Therefore, the dequantized Hadamard's transformation coefficients $A'_{vu}$ are not changed in Step S130.

After the execution of Step S130, Step S140 is executed in which a second corrected coefficient generating process is executed, so that the 15 corrected dequantized Hadamard's transformation coefficients $A''_{03}$, $A''_{05}$, $A''_{06}$, $A''_{11}$, $A''_{12}$, $A''_{14}$, $A''_{21}$, $A''_{22}$, $A''_{24}$, $A''30$, $A''_{41}$, $A''42$, $A''_{44}$, $A''_{50}$ and $A''_{60}$ are generated based on the dequantized Hadamard's transformation coefficients $A'_{vu}$, which are renewed in Step S130, and the remainders $M^4_{vu}$, as shown in FIG. 16.

The dequantized Hadamard's transformation coefficients $A'_{vu}$ corresponding to the 15 corrected dequantized Hadamard's transformation coefficients are quantized and dequantized by the respective quantization coefficients $Q_{vu}$, which are 4. Namely, the 15 dequantized Hadamard's transformation coefficients $A'_{vu}$ are obtained by dividing the Hadamard's transformation coefficients $A_{vu}$ by 4, rounding off the result, and then multiplying by 4. Therefore, if the remainder $M^4_{vu}$ of the Hadamard's transformation coefficient $A_{vu}$ is 0, i.e. if the Hadamard's transformation coefficient $A_{vu}$ is a multiple of 4, the Hadamard's transformation coefficient $A_{vu}$ coincides with the corresponding dequantized Hadamard's transformation coefficient $A'_{vu}$.

A case in which the absolute value of the remainder $M^4_{vu}$ is 1 is described below. When the Hadamard's transformation coefficient $A_{vu}$ is positive, this case also applies to a case in which the remainder $M^2_{vu}$ is 1. Therefore, the dequantized Hadamard's transformation coefficient $A'_{vu}$ has been renewed in Step S110, and thus the Hadamard's transformation coefficient $A_{vu}$ coincides with the dequantized Hadamard's transformation coefficient $A'_{vu}$. Conversely, when the Hadamard's transformation coefficient $A_{vu}$ is negative, this is increased by 1 due to the quantization and the dequantization, increased by 1 in Step S110, and increased by 2 in Step S138. Therefore, the dequantized Hadamard's transformation coefficient $A'_{vu}$ becomes greater than the corresponding Hadamard's transformation coefficient $A_{vu}$ by 4.

For example, when the Hadamard's transformation coefficient $A_{vu}$ is 21 and the quantization coefficient $Q_{vu}$ is 4, the dequantized Hadamard's transformation coefficient $A'_{vu}$ is 20, the remainder $M^2_{vu}$ is 1, and the remainder $M^4_{vu}$ is 1. The value of the dequantized Hadamard's transformation coefficient $A'_{vu}$ is changed to 21 in Step S110, and Step S138 is not executed, so that the value (=21) is not changed. Conversely, when the Hadamard's transformation coefficient $A_{vu}$ is −21 and the quantization coefficient $Q_{vu}$ is 4, the dequantized Hadamard's transformation coefficient $A'_{vu}$ is −20, the remainder big is −1, and the remainder $M^4_{vu}$ is −1. The value of the dequantized Hadamard's transformation coefficient $A'_{vu}$ is changed to −19 in Step S110, and Step S138 is executed, so that the value is changed to −17.

A case, in which the absolute value of the remainder $M^4_{vu}$ is 2, is described below. When the Hadamard's transformation coefficient $A_{vu}$ is positive, the dequantized Hadamard's transformation coefficient $A'_{vu}$ is increased by 2, in comparison with the Hadamard's transformation coefficient $A_{vu}$, due to the quantization and the dequantization. Then, 2 is added to the dequantized Hadamard's transformation coefficient $A'_{vu}$ in Step S138, and thus, the dequantized Hadamard's transformation coefficient $A'_{vu}$ becomes greater than the corresponding Hadamard's transformation coefficient $A_{vu}$ by 4. Conversely, when the Hadamard's transformation coefficient $A_{vu}$ is negative, the dequantized Hadamard's transformation coefficient $A'_{vu}$ is decreased by 2, in comparison with the Hadamard's transformation coefficient $A_{vu}$, due to the quantization and the dequantization. However, 2 is added to the dequantized Hadamard's transformation coefficient $A'_{vu}$ in Step S138, and thus the dequantized Hadamard's transformation coefficient $A'_{vu}$ coincides with the corresponding Hadamard's transformation coefficient $A_{vu}$.

For example, when the Hadamard's transformation coefficient $A_{vu}$ is 22 and the quantization coefficient $Q_{vu}$ is 4, the dequantized Hadamard's transformation coefficient $A'_{vu}$ is 24, the remainder $M^2_{vu}$ is 0, and the remainder $M^4_{vu}$ is 2. The value of the dequantized Hadamard's transformation coefficient $A'_{vu}$ is maintained at 24 in Step S110, and changed to 26 in Step S138. Conversely, when the Hadamard's transformation coefficient $A_{vu}$ is −22 and the quantization coefficient $Q_{vu}$ is 4, the dequantized Hadamard's transformation coefficient $A'_{vu}$ is −24, the remainder $M^2_{vu}$ is 0, and the remainder $M^4_{vu}$ is −2. The value of the dequantized Hadamard's transformation coefficient $A'_{vu}$ is maintained in Step S110, and is changed from −24 to −22 in Step S138.

A case, in which the absolute value of the remainder $M^4_{vu}$ is 3, is described below. When the Hadamard's transformation coefficient $A_{vu}$ is positive, the dequantized Hadamard's transformation coefficient $A'_{vu}$ is increased by 1, in comparison with the Hadamard's transformation coefficient $A_{vu}$, due to the quantization and the dequantization. Then, in the first renewal process, 1 is added to the dequantized Hadamard's transformation coefficient $A'_{vu}$, since the remainder $M^2$ is 1, and in Step S138, 2 is added. Therefore, the dequantized Hadamard's transformation coefficient $A'_{vu}$ becomes greater than the corresponding Hadamard's transformation coefficient $A_{vu}$ by 4. Conversely, when the Hadamard's transformation coefficient $A_{vu}$ is negative, the dequantized Hadamard's transformation coefficient $A'_{vu}$ is renewed in the first renewal process, and thus, the dequantized Hadamard's transformation coefficient $A'_{vu}$ coincides with the corresponding Hadamard's transformation coefficient $A_{vu}$.

For example, when the Hadamard's transformation coefficient $A_{vu}$ is 23 and the quantization coefficient $Q_{vu}$ is 4, the dequantized Hadamard's transformation coefficient $A'_{vu}$ is 24, the remainder $M^2_{vu}$ is 1, and the remainder $M^4_{vu}$ is 3. The value of the dequantized Hadamard's transformation coefficient $A'_{vu}$ is changed to 25 in Step S110, and changed to 27 in Step S138. Conversely, when the Hadamard's transformation coefficient $A_{vu}$ is −23 and the quantization coefficient $Q_{vu}$ is 4, the dequantized Hadamard's transformation coefficient $A'_{vu}$ is −24, the remainder $M^2_{vu}$ is −1, and the remainder $M^4_{vu}$ is −3. The value of the dequantized Hadamard's transformation coefficient $A'_{vu}$ is changed to −23 in Step S110, and is not changed in Step S130.

Thus, the dequantized Hadamard's transformation coefficients $A'_{vu}$, which have been obtained by quantizing and dequantizing the Hadamard's transformation coefficients $A_{vu}$ by 4, are obtained while classifying each case in accordance with the value of the remainder $M^4_{vu}$. In the second corrected coefficient generating process (Step S140), the calculations described above are executed.

The second corrected coefficient generating process is performed according to the flowchart shown in FIG. 11. This process is repeatedly performed for the 15 dequantized Hadamard's transformation coefficients $A''_{vu}$, which correspond to $Q_{vu}=4$, so that 15 corrected dequantized Hadamard's transformation coefficients $A''_{vu}$ are generated.

In Step S141, the 15 respective remainders $M^4_{vu}$ are renewed. Namely, the 15 respective remainders $M^4_{vu}$ are obtained based on the 15 corresponding dequantized Hadamard's transformation coefficients $A'_{vu}$ renewed in Step S130, and these 15 remainders $M^4_{vu}$ set in Step S131 are replaced with the respective renewed remainders $M^4_{vu}$. Then, Step S142 is executed in which it is determined whether the renewed remainder $M^4_{vu}$ in question is 0. When the remainder $M^4_{vu}$ is 0, Step S154 is executed, in which the corresponding dequantized Hadamard's transformation coefficient $A'_{vu}$ is set as the corrected dequantized Hadamard's transformation coefficient $A''_{vu}$. Then, this routine ends.

Conversely, when it is determined in Step S142 that the remainder $M^4_{vu}$ is not 0, Step S144 is executed, in which it is determined whether the corresponding dequantized Hadamard's transformation coefficient $A'_{vu}$ is positive. When the dequantized Hadamard's transformation coefficient $A'_{vu}$ is positive, Step S146 is executed, and when the dequantized Hadamard's transformation coefficient $A'_{vu}$ is negative, Step S150 is executed.

In Step S146, it is determined whether the remainder $M^4_{vu}$ is less than 2, i.e. equal to 1. When the remainder $M^4_{vu}$ is 1, Step S154 is executed, and this routine ends. Conversely, when the remainder $M^4_{vu}$ is 2 or 3, Step S148 is executed, in which 4 is subtracted from the respective dequantized Hadamard's transformation coefficient $A'_{vu}$ to obtain the corrected dequantized Hadamard's transformation coefficient $A''_{vu}$, and this routine ends.

In Step S150, it is determined whether the remainder $M^4_{vu}$ is greater than −2, i.e. equal to −1. When the remainder $M^4_{vu}$ is −1, Step S148 is executed. Conversely, when the remainder $M^4_{vu}$ is −2 or −3, Step S152 is executed, in which the respective dequantized Hadamard's transformation coefficient $A'_{vu}$ is set as the corrected dequantized Hadamard's transformation coefficient $A''_{vu}$. Then, this routine ends.

In the second corrected coefficient generating process, when the remainders $M^4_{vu}$ are 0, 1, −2 or −3, the corrected dequantized Hadamard's transformation coefficients $A''_{vu}$ have the same values as those of the corresponding dequantized Hadamard's transformation coefficients $A'_{vu}$, and when the remainders $M^4_{vu}$ is 2, 3 or −1, the corrected dequantized Hadamard's transformation coefficients $A''_{vu}$ have the values which are obtained by subtracting 4 from the corresponding dequantized Hadamard's transformation coefficients $A'_{vu}$.

As described above, in the second renewal process and the second corrected coefficient generating process, by correcting the dequantized Hadamard's transformation coefficients $A'_{vu}$, which have been quantized by 4, using the remainder $M^4_{vu}$, the 15 corrected dequantized Hadamard's transformation coefficients $A''_{vu}$ are obtained. The 15 corrected dequantized Hadamard's transformation coefficients $A''_{vu}$, corresponding to the quantization coefficient $Q_{vu}$ of 4, are the same as the corresponding Hadamard's transformation coefficients $A_{vu}$.

For example, when the Hadamard's transformation coefficients $A_{06}$ is −42 (see FIG. 3), the dequantized Hadamard's transformation coefficients $A'_{06}$ is −44 (see FIG. 6A), and the remainder $M^4_{06}$ (=−2) is obtained in Step S131. In Step S138, 2 is added to the dequantized Hadamard's transformation coefficient $A'_{06}$ to become −42, and then, Steps S144, S150 and S152 are executed so that the corrected dequantized Hadamard's transformation coefficient $A''_{06}$ (=−42) is obtained (see FIG. 6B).

In FIG. 7A, after the execution of Step S140, Step S160 is executed in which a third renewal process is executed. The third renewal process is performed in a similar way as the second renewal process. Namely, based on the remainders $M^8_{vu}$, which are remainders generated when the known 22 corrected dequantized Hadamard's transformation coefficients $A''_{vu}$ are divided by 8, and a sum of eight corrected dequantized Hadamard's transformation coefficients $A''_{vu}$, the sum being a multiple of 8, remaining 42 remainders $M^8_{vu}$ are obtained. Then, based on these remainders $M^8_{vu}$, the 42 corresponding dequantized Hadamard's transformation coefficients $A'_{vu}$ are renewed.

FIG. 17 is a table showing known remainders $M^8_{vu}$ and unknown remainders $M^8_{vu}$ which can be obtained based on the known remainders $M^8_{vu}$. FIG. 18 shows the remainders $M^8_{vu}$ of the Hadamard's transformation coefficients $A_{vu}$ shown in FIG. 3, in a form of an 8×8 matrix. The remainders $M^8_{vu}$ enclosed by rectangular frames correspond to the known remainders $M^8_{vu}$ indicated in left columns in FIG. 17. The remainders $M^8_{vu}$ enclosed by circles correspond to corrected dequantized Hadamard's transformation coefficients $A''_{vu}$ which can be obtained in Steps S160 and S162. The positions of the circled remainders $M^8_{vu}$ in the 8×8 matrix correspond to the positions of the quantization coefficients $Q_{vu}$ which are 8. FIG. 19 shows the corrected dequantized Hadamard's transformation coefficients $A''_{vu}$ in a form of an 8×8 matrix. The numerals enclosed by rectangular frames indicate the corrected dequantized Hadamard's transformation coefficients $A''_{vu}$, which have been obtained before the execution of Step S160, and the numerals, which are not enclosed by frames, indicate the 20 corrected dequantized Hadamard's transformation coefficients $A''_{vu}$ which are obtained via Steps S160 and S162.

The third renewal process is performed in a similar way as the second renewal process, as described below.

Since the sum of the Hadamard's transformation coefficients $A_{00}, A_{20}, A_{40}, A_{60}, A_{02}, A_{22}, A_{42}$ and $A_{62}$, is a multiple of 8, a sum of the remainders $M^8_{00}, M^8_{20}, M^8_{40}, M^8_{60}, M^8_{02}, M^8_{22}, M^8_{42}$ and $M^8_{62}$ is also a multiple of 8. Since, the remainders $M^8_{00}, M^8_{20}, M^8_{40}, M^8_{60}, M^8_{02}, M^8_{22}$ and $M^8_{42}$ are known, the remainder $M^8_{62}$ can be generated.

The remainder $M^8_{64}$ can be generated using the known remainders $M^8_{00}, M^8_{20}, M^8_{40}, M^8_{60}, M^8_{02}, M^8_{22}, M^8_{42}, M^8_{62}, M^8_{04}, M^8_{24}$ or $M^8_{44}$. Actually, since a sum of the remainders $M^8_{00}, M^8_{20}, M^8_{40}, M^8_{60}, M^8_{04}, M^8_{24}, M^8_{44}$ is −8, the remainder $M^8_{64}$ is 0.

The remainder $M^8_{26}$ is generated using the known remainders $M^8_{00}, M^8_{20}, M^8_{02}, M^8_{22}, M^8_{04}, M^8_{24}$ and $M^8_{06}$. The remainder $M^8_{46}$ is generated using the known remainders $M^8_{00}, M^8_{40}, M^8_{02}, M^8_{42}, M^8_{04}, M^8_{44}$ and $M^8_{06}$. The remainder $M^8_{66}$ is generated using the known remainders $M^8_{00}, M^8_{60}, M^8_{02}, M^8_{62}, M^8_{04}, M^8_{64}$ and $M^8_{06}$.

The remainder $M^8_{70}$ is generated using the known remainders $M^8_{00}, M^8_{10}, M^8_{20}, M^8_{30}, M^8_{40}, M^8_{50}$ and $M^8_{60}$, which are sequentially arranged in a vertical column in the 8×8 matrix, based on the the sum of the remainders $M^8_{00}, M^8_{10}, M^8_{20}, M^8_{30}, M^8_{40}, M^8_{50}, M^8_{60}$, and $M^8_{70}$, which is a multiple of 8.

The remainders $M^8_{32}, M^8_{52}, M^8_{72}$ are generated using the known remainders $M^8_{00}, M^8_{20}, M^8_{40}, M^8_{60}, M^8_{02}, M^8_{22}, M^8_{42}, M^8_{62}, M^8_{04}, M^8_{24}, M^8_{44}, M^8_{64}, M^8_{06}, M^8_{26}, M^8_{46}, M^8_{66}, M^8_{10}, M^8_{30}, M^8_{50}, M^8_{70}$ and $M^8_{12}$. The remainder $M^8_{32}$ is obtained using the remainders $M^8_{00}, M^8_{10}, M^8_{20}, M^8_{30}, M^8_{02}, M^8_{12}, M^8_{22}$ and $M^8_{42}$. The remainder $M^8_{52}$ is obtained using the remainders $M^8_{20}, M^8_{30}, M^8_{40}, M^8_{50}, M^8_{22}, M^8_{32}$ and $M^8_{42}$. The remainder $M^8_{72}$ is obtained using the remainders $M^8_{40}, M^8_{50}, M^8_{60}, M^8_{70}, M^8_{42}, M^8_{52}$ and $M^8_{62}$.

In a similar way, the other unknown remainders $M^8_{vu}$ can be generated based on the known remainders $M^8_{vu}$.

In Step S162, a third corrected coefficient generating process is executed. The third corrected coefficient generating process is executed in a similar way as the second corrected coefficient generating process. Namely, based on the 42 dequantized Hadamard's transformation coefficients $A'_{vu}$, which have been renewed in Step S160, and the 64 remainders $M^8_{vu}$, the 20 corrected dequantized Hadamard's transformation coefficients $A''_{vu}$ are generated, which correspond to quantization coefficients $Q_{vu}$ of 8.

Then, Step S164 is executed, in which a fourth renewal process is executed. The fourth renewal process is performed in a similar way as the second and third renewal processes. Namely, based on the remainders $M^{16}_{vu}$, which are remainders when the known 42 corrected dequantized Hadamard's transformation coefficients $A''_{vu}$ are divided by 16, and a sum of 16 corrected Hadamard's transformation coefficients $A''_{vu}$, the sum being a multiple of 16, transformation coefficients $A''_{vu}$, the sum being a multiple of 16, remaining 22 remainders $M^{16}_{vu}$ are obtained. Then, based on these remainders $M^{16}_{vu}$, the 22 corresponding dequantized Hadamard's transformation coefficients $A'_{vu}$ are renewed.

FIG. 20 is a table showing known remainders $M^{16}_{vu}$ and unknown remainders $M^{16}_{vu}$ which can be obtained based on the known remainders $M^{16}_{vu}$. FIG. 21 shows the 64 remainders $M^{16}_{vu}$ of the Hadamard's transformation coefficients $A_{vu}$ shown in FIG. 3, in a form of an 8×8 matrix. FIG. 22 shows the corrected dequantized Hadamard's transformation coefficients $A''_{vu}$ in a form of an 8×8 matrix. The numerals enclosed by rectangular frames indicate the corrected dequantized Hadamard's transformation coefficients $A''_{vu}$, which have been obtained before the execution of Step S164. The numerals, which are not enclosed by frames indicate the 15 corrected dequantized Hadamard's transformation coefficients $A''_{vu}$, which are obtained via Steps S164 and S166, and which correspond to the remainders $M^{16}_{vu}$ enclosed by circles in FIG. 21.

In Step S166, a fourth corrected coefficient generating process is executed. The fourth corrected coefficient generating process is executed in a similar way as the second and third corrected coefficient generating processes. Namely, based on the 22 dequantized Hadamard's transformation coefficients $A'_{vu}$, which have been renewed in Step S164, and the 64 remainders $M^{16}_{vu}$, the 15 corrected dequantized Hadamard's transformation coefficients $A'_{vu}$ are generated, which correspond to quantization coefficients $Q_{vu}$ of 16.

Then, Step S168 is executed, in which a fifth renewal process is executed. The fifth renewal process is performed in a similar way as the second through fourth renewal processes. Namely, based on the 64 remainders $M^{32}_{vu}$, which are remainders when the known 57 corrected dequantized Hadamard's transformation coefficients $A''_{vu}$ are divided by 32, and a sum of 32 corrected Hadamard's transformation coefficients $A''_{vu}$, the sum being a multiple of 32, remaining 7 remainders $M^{32}_{vu}$ are obtained. Then, based on these remainders $M^{32}_{vu}$, the 7 corresponding dequantized Hadamard's transformation coefficients $A'_{vu}$ are renewed.

FIG. 23 is a table showing known remainders $M^{32}_{vu}$ and unknown remainders $M^{32}_{vu}$, which can be obtained based on the known remainders $M^{32}_{vu}$. FIG. 24 shows the 64 remainders $M^{32}_{vu}$ of the Hadamard's transformation coefficients $A_{vu}$ shown in FIG. 3, in a form of an 8×8 matrix. FIG. 25 shows the corrected dequantized Hadamard's transformation coefficients $A''_{vu}$ in a form of an 8×8 matrix. The numerals enclosed by rectangular frames indicate the corrected dequantized Hadamard's transformation coefficients $A''_{vu}$, which have been obtained before the execution of Step S168. The numerals, which are not enclosed by frames indicate the 6 corrected dequantized Hadamard's transformation coefficients $A''_{vu}$, which are obtained via Steps S168 and S170, and which correspond to the 6 remainders $M^{32}_{vu}$ enclosed by circles in FIG. 24.

In Step S170, a fifth corrected coefficient generating process is executed. The fifth corrected coefficient generating process is executed in a similar way as the second through fourth corrected coefficient generating processes. Namely, based on the 7 dequantized Hadamard's transformation coefficients $A'_{vu}$, which have been renewed in Step S168, and the 64 remainders $M^{32}_{vu}$, the 6 corrected dequantized Hadamard's transformation coefficients $A''_{vu}$ are generated, which correspond to quantization coefficient $Q_{vu}$ of 32.

Then, Step S172 is executed, in which a sixth renewal process is executed. The sixth renewal process is performed in a similar way as the second through fifth renewal processes. Namely, based on the 64 remainders $M^{64}_{vu}$, which are remainders when the known 63 corrected dequantized Hadamard's transformation coefficients $A''_{vu}$ are divided by 64, and a sum of 64 corrected Hadamard's transformation coefficients $A''_{vu}$, the remaining remainder $M^{64}_{77}$ is obtained. Then, based on these remainders $M^{64}_{77}$, the dequantized Hadamard's transformation coefficient $A'_{77}$ is renewed.

FIG. 26 shows the 64 remainders $M^{64}_{vu}$ of the Hadamard's transformation coefficients $A_{vu}$ shown in FIG. 3, in a form of an 8×8 matrix. FIG. 27 shows the corrected dequantized Hadamard's transformation coefficient $A''_{vu}$ in a form of an 8×8 matrix. The numeral, which is not enclosed by a frame, indicates the corrected dequantized Hadamard's transformation coefficient $A''_{77}$, which is obtained via Steps S172 and S174, based on the remainder $M^{64}_{77}$ enclosed by a circle in FIG. 26.

In Step S174, a sixth corrected coefficient generating process is executed. In the sixth corrected coefficient generating process, based on the dequantized Hadamard's transformation coefficient $A'_{77}$, which has been renewed in Step S172, and the remainder $M^{64}_{77}$, the corrected dequantized Hadamard's transformation coefficient $A''_{77}$ is generated.

Thus, the corrected dequantized Hadamard's transformation coefficient generating process ends.

In the corrected dequantized Hadamard's transformation coefficient generating process, a process, in which the remainders are obtained in order of 2, 4, 8, 16, 32 and 64, which are quantization coefficients to the powers of 2, and a process, in which the dequantized Hadamard's transformation coefficients processes $A'_{vu}$ are renewed based on the remainders, are alternately carried out, so that the corrected dequantized Hadamard's transformation coefficients $A''_{00}$ through $A''_{77}$ are obtained as shown in FIGS. 13, 16, 19, 22, 25 and 27. The corrected dequantized Hadamard's transformation coefficients $A''_{vu}$, generated in the flowchart shown in FIGS. 7A and 7B, coincide with the Hadamard's transformation coefficients $A_{vu}$ shown in FIG. 3. Thus, the Hadamard's transformation coefficients $A_{vu}$ have been exactly converted using a reversible method. Accordingly, reproduced image data, possessing less image deterioration relative to the original image data than that obtained in a conventional method, can be generated.

The information amount for obtaining the remainder, which occurs when a number is divided by 64, is 6 bits for each of 64 coefficients, i.e. 384 bits are required in all. In this embodiment, however, the information amount required in the corrected dequantized Hadamard's transformation coefficient generating process, in which the remainders are obtained in six steps, is a half of 384 bits. The information amount regarding the remainder of 2 is 1 bit, since the information amount can be calculated by recognizing whether the remainder $M^2_{00}$ is 1 or 0. The information amount regarding the remainder of 4 is 7 bits which correspond to the seven remainders $M^4_{vu}$ enclosed by the rectangular frames in FIG. 15. Similarly, the information amounts regarding the remainders of 8, 16, 32 and 64 are 22, 42, 57 and 63 bits, respectively. Accordingly, with also 192 bits, i.e. a half of 384 bits, the Hadamard's transformation coefficients $A_{vu}$ can still be exactly reproduced.

Further, since the image information, represented by the quantized Hadamard's transformation coefficients $B_{vu}$ (see FIG. 3), is concentrated towards the lower spatial frequencies of the 8×8 matrix, due to the formation of the quantization table, approximately the same compression ratio as that of the JPEG system can be obtained when image information is compressed using the Huffman encoding. Further, since the quantization table is formed of coefficients to the power of 2, in accordance with the characteristics of the Hadamard's transformation, the expansion of image information can be performed exactly, and reproduced image data, having no quantization error, which has previously occurred in a conventional compression and expansion process, can be easily obtained.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-203879 (filed on Jul. 14, 1997) and No. 10-103438 (filed on Mar. 31, 1998) which are expressly incorporated herein, by reference, in their entirety.

What is claimed is:

1. An image compression device comprising:

an Hadamard's transformation processor that applies an Hadamard's transformation to image data inputted to said image compression device to obtain Hadamard's transformation coefficients corresponding to said image data; and a quantization processor that quantizes said Hadamard's transformation coefficients by a quantization table consisting of quantization coefficients to obtain quantized Hadamard's transformation coefficients, each of said quantization coefficients being to the power of 2, thus providing a capability to obtain corrected quantized Hadamard's transformation coefficients in an image expansion device.

2. A device according to claim 1, wherein said quantization table is composed of "n"×"n" coefficients $Q_{vu}$, in which "v" and "u" are integers and larger than 0, and are symmetrical about a line in which coefficients $Q_{mm}$ ($0 \leq m \leq v$ or u) are arranged.

3. A device according to claim 2, wherein said quantization table is $$\begin{bmatrix} 1 & 2 & 2 & 4 & 2 & 4 & 4 & 8 \\ 2 & 4 & 4 & 8 & 4 & 8 & 8 & 16 \\ 2 & 4 & 4 & 8 & 4 & 8 & 8 & 16 \\ 4 & 8 & 8 & 16 & 8 & 16 & 16 & 32 \\ 2 & 4 & 4 & 8 & 4 & 8 & 8 & 16 \\ 4 & 8 & 8 & 16 & 8 & 16 & 16 & 32 \\ 4 & 8 & 8 & 16 & 8 & 16 & 16 & 32 \\ 8 & 16 & 16 & 32 & 16 & 32 & 32 & 64 \end{bmatrix}.$$

4. An image expansion device comprising:

an inverse quantization processor that dequantizes quantized Hadamard's transformation coefficients by using a quantization table consisting of quantization coefficients to obtain dequantized Hadamard's transformation coefficients, each of said quantization coefficients being to the power of 2;

a corrected coefficient generating processor that obtains corrected dequantized Hadamard's transformation coefficients, based on said dequantized Hadamard's transformation coefficients, each of said corrected dequantized Hadamard's transformation coefficients has the same value as each of Hadamard's transformation coefficients; and an image data reproducing processor that applies an inverse Hadamard's transformation to said corrected dequantized Hadamard's transformation coefficients to reproduce image data.

5. A device according to claim 4, wherein said quantization table is composed of "n"×"n" coefficient $Q_{vu}$, in which "v" and "u" are integers and larger than 0, and are symmetrical about a line in which coefficients $Q_{mm}$ ($0 \leq m \leq v$ or u) are arranged.

6. A device according to claim 5, wherein said quantization table is $$\begin{bmatrix} 1 & 2 & 2 & 4 & 2 & 4 & 4 & 8 \\ 2 & 4 & 4 & 8 & 4 & 8 & 8 & 16 \\ 2 & 4 & 4 & 8 & 4 & 8 & 8 & 16 \\ 4 & 8 & 8 & 16 & 8 & 16 & 16 & 32 \\ 2 & 4 & 4 & 8 & 4 & 8 & 8 & 16 \\ 4 & 8 & 8 & 16 & 8 & 16 & 16 & 32 \\ 4 & 8 & 8 & 16 & 8 & 16 & 16 & 32 \\ 8 & 16 & 16 & 32 & 16 & 32 & 32 & 64 \end{bmatrix}.$$

7. A device according to claim 4, wherein said corrected coefficient generating processor obtains each of said corrected dequantized Hadamard's transformation coefficients based on a remainder obtained when each of said dequantized Hadamard's transformation coefficients is divided by respective said quantization coefficients.

8. A device according to claim 7, wherein a first group of said dequantized Hadamard's transformation coefficients are divided by 2 to obtain first remainders, and a first group of said corrected dequantized Hadamard's transformation coefficients are generated based on said first remainders.

9. A device according to claim 7, wherein said corrected coefficient generating processor increases or decreases said dequantized Hadamard's transformation coefficients by a predetermined value based on a sign of each of said dequantized Hadamard's transformation coefficients and an amount and a sign of said remainder, so that each of said corrected dequantized Hadamard's transformation coefficients is obtained.

10. A device according to claim 7, wherein said corrected coefficient generating processor sets said dequantized Hadamard's transformation coefficients as said corrected dequantized Hadamard's transformation coefficients when said remainder is 0.

* * * * *